United States Patent
Schukar et al.

(10) Patent No.: US 6,887,343 B2
(45) Date of Patent: May 3, 2005

(54) FILTER COATING, WINDING, FINISHING AND MANUFACTURING SYSTEM

(75) Inventors: Murray R. Schukar, Fitchburg, WI (US); Brian K. Fillbach, McFarland, WI (US); Gary J. Frank, Stoughton, WI (US); Craig A. Clayton, Oregon, WI (US); Douglas P. Marquis, McFarland, WI (US); Matthew P. Henrichsen, Evansville, WI (US); Robert K. Miller, Indianapolis, IN (US); William C. Haberkamp, Cookeville, TN (US); Darryl J. Gust, Columbus, IN (US); Kurt M. A. Badeau, Evansville, WI (US); Steven D. Stokstad, Stoughton, WI (US); Travis E. Goodlund, McFarland, WI (US); Thomas A. Fosdal, Stoughton, WI (US); O. Michael Bowling, North Vernon, IN (US); Randolph G. Zoran, McFarland, WI (US)

(73) Assignee: Fleetguard, Inc., Nashville, TN (US)

( * ) Notice: Subject to any disclaimer, the term of this patent is extended or adjusted under 35 U.S.C. 154(b) by 50 days.

(21) Appl. No.: 10/325,090

(22) Filed: Dec. 20, 2002

(65) Prior Publication Data
US 2004/0118771 A1 Jun. 24, 2004

(51) Int. Cl.[7] .............................................. B65H 27/00

(52) U.S. Cl. ........................ 156/905; 55/520; 156/205; 210/493.4; 242/530.2; 242/541.2; 242/541.4

(58) Field of Search ................... 55/520, 521; 156/184, 156/195, 202, 205, 207; 210/321.83, 321.85, 489, 490, 493.4, 497.1; 242/530.2, 534, 541.2–541.5

(56) References Cited

U.S. PATENT DOCUMENTS

| 1,807,894 A | | 6/1931 | Casto et al. |
| 2,599,604 A | * | 6/1952 | Bauer et al. ............. 210/494.1 |
| 2,939,645 A | | 6/1960 | Rowlands et al. |
| 3,098,619 A | | 7/1963 | Washburn |

(Continued)

FOREIGN PATENT DOCUMENTS

JP  40-1009722  1/1989

OTHER PUBLICATIONS

Japan, JP 40–1009722A Abstract, published Jan. 13, 1989.

Primary Examiner—Joseph Drodge
(74) Attorney, Agent, or Firm—Andrus, Sceales, Starke & Sawall, LLP

(57) ABSTRACT

A coating system (66, 68), winding system (158), finishing system (274, 276) and manufacturing system (FIGS. 6, 7, 22–29) is provided for spiral-wound fluted filter media (74, 130).

10 Claims, 14 Drawing Sheets

U.S. PATENT DOCUMENTS

| | | |
|---|---|---|
| 3,155,541 A | 11/1964 | Jackson |
| 3,315,908 A * | 4/1967 | Wetzler .................... 242/535.1 |
| 3,506,475 A | 4/1970 | MacDonnell |
| 3,640,203 A | 2/1972 | Raab et al. |
| 3,828,665 A | 8/1974 | Ogura et al. |
| 3,936,541 A | 2/1976 | Plowman et al. |
| 4,022,154 A | 5/1977 | Christensen et al. |
| 4,141,314 A | 2/1979 | Newson |
| 4,583,697 A | 4/1986 | Bichot et al. |
| 4,603,060 A | 7/1986 | Mitsuda et al. |
| 4,607,683 A | 8/1986 | Hamashima et al. |
| 4,765,554 A | 8/1988 | Tuffal et al. |
| 4,796,559 A | 1/1989 | Lohse |
| 4,981,077 A | 1/1991 | Alvarez |
| 5,425,512 A | 6/1995 | Bichot et al. |
| 5,435,870 A * | 7/1995 | Takagaki et al. ............ 156/189 |
| 5,478,599 A | 12/1995 | Iyer et al. |
| 5,628,868 A | 5/1997 | Marschke et al. |
| 5,631,048 A | 5/1997 | Kinose et al. |
| 5,639,370 A * | 6/1997 | Fall et al. .................... 210/489 |
| 5,755,883 A | 5/1998 | Kinose et al. |
| 5,826,296 A | 10/1998 | Steven |
| 5,832,696 A | 11/1998 | Nagy et al. |
| 6,123,284 A | 9/2000 | Bichot et al. |
| 6,210,480 B1 | 4/2001 | Mai |
| 6,277,196 B1 | 8/2001 | Woodman et al. |
| 6,398,832 B2 | 11/2001 | Morgan et al. |
| 6,387,180 B1 | 5/2002 | Takahashi et al. |
| 6,416,605 B1 | 7/2002 | Golden |
| 6,444,006 B1 | 9/2002 | Haberkamp et al. |
| 2002/0129764 A1 | 9/2002 | Jacobson et al. |

\* cited by examiner

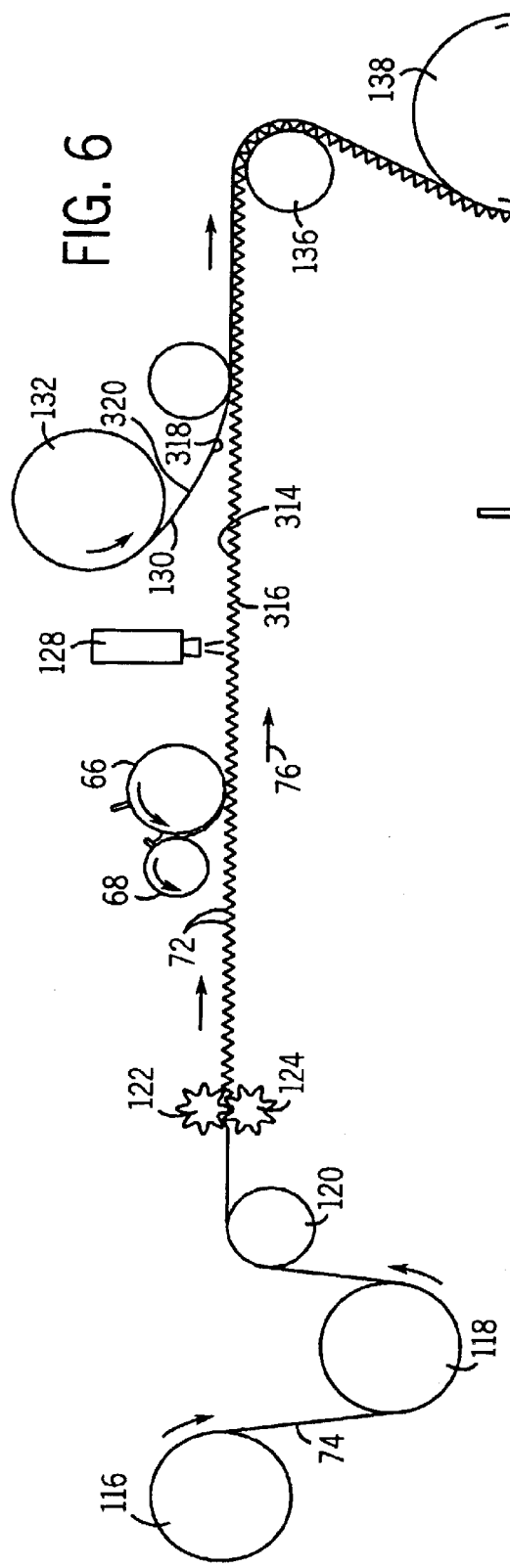
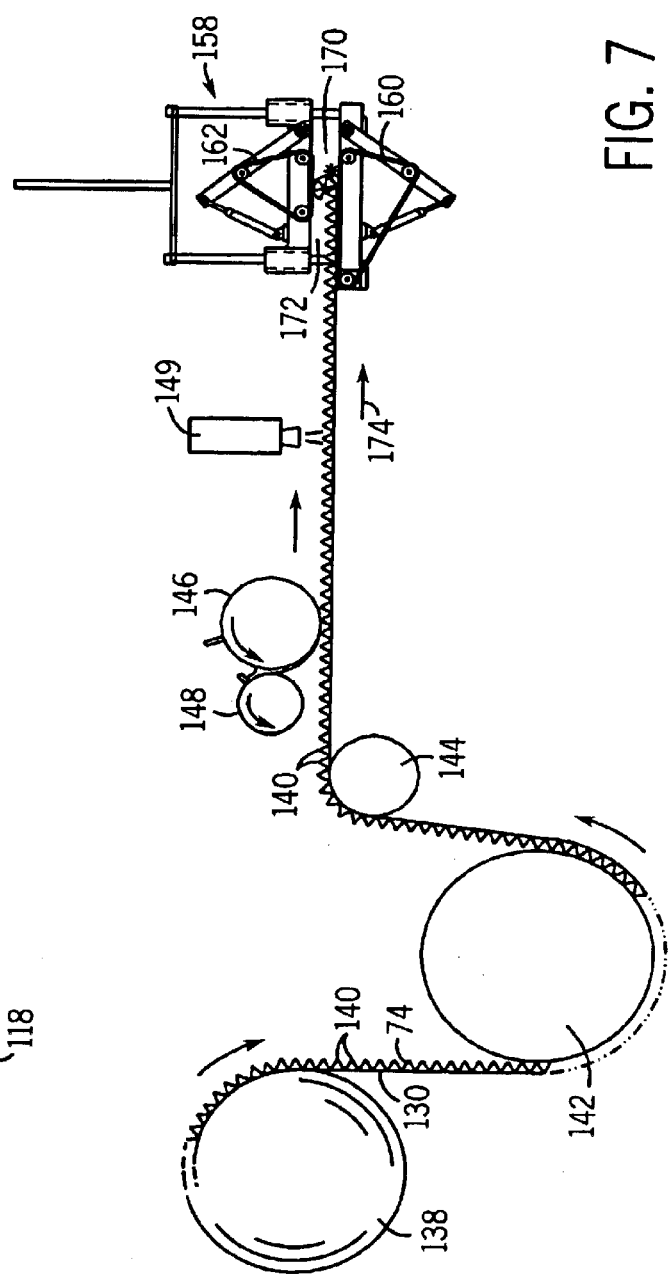

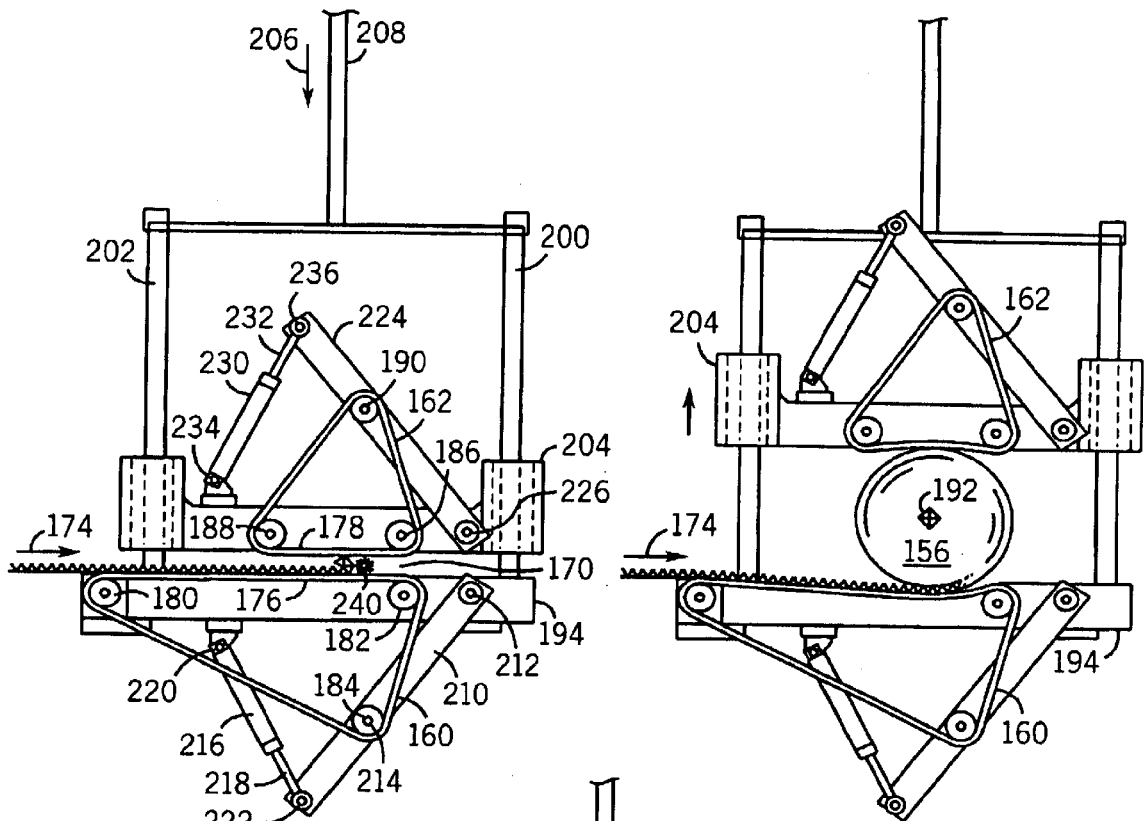
FIG. 9
FIG. 10
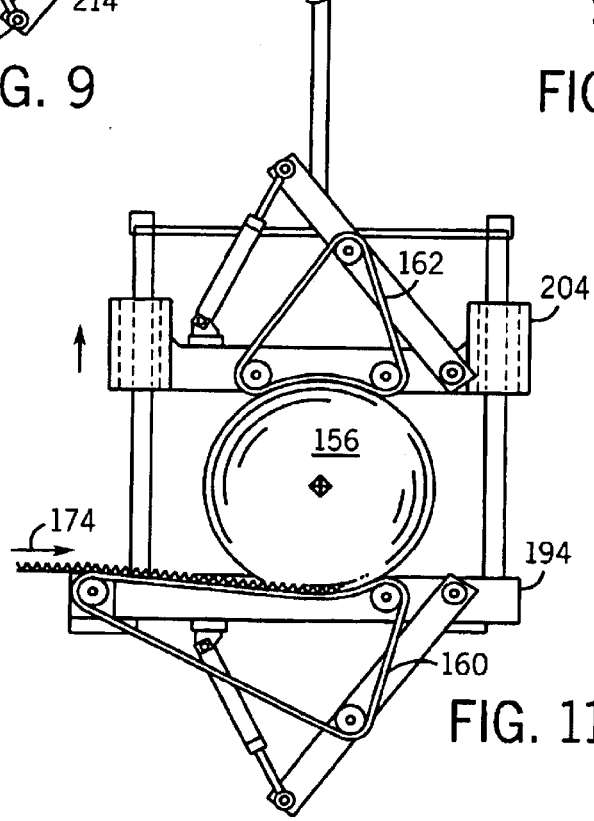
FIG. 11

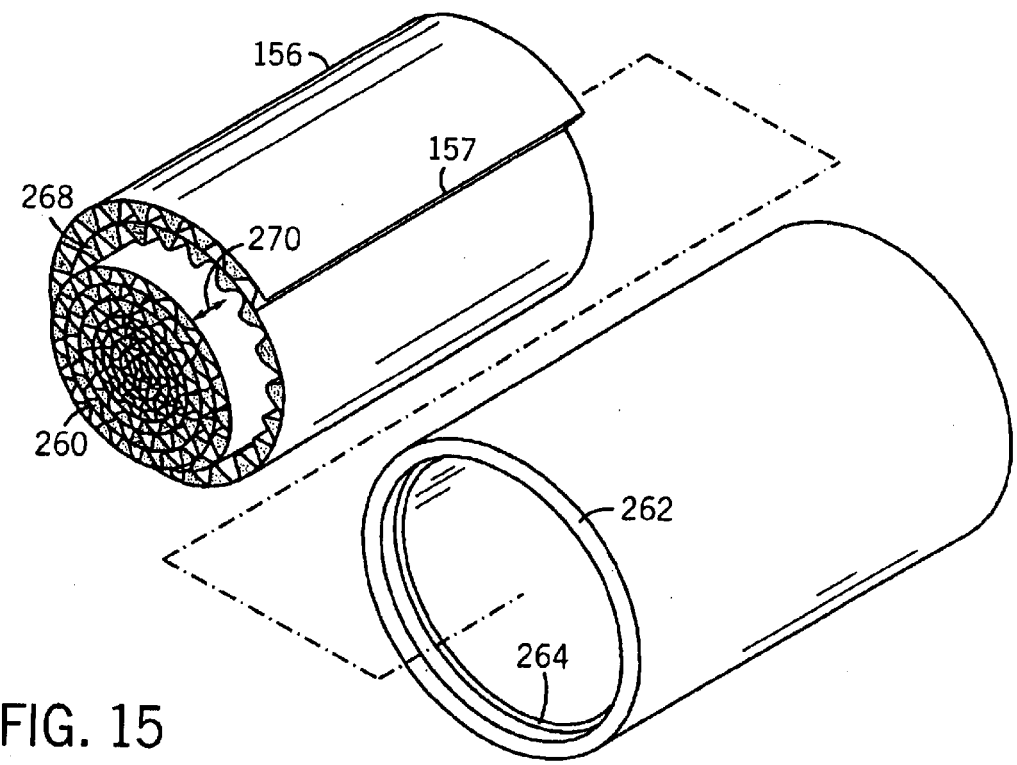
FIG. 15
FIG. 16
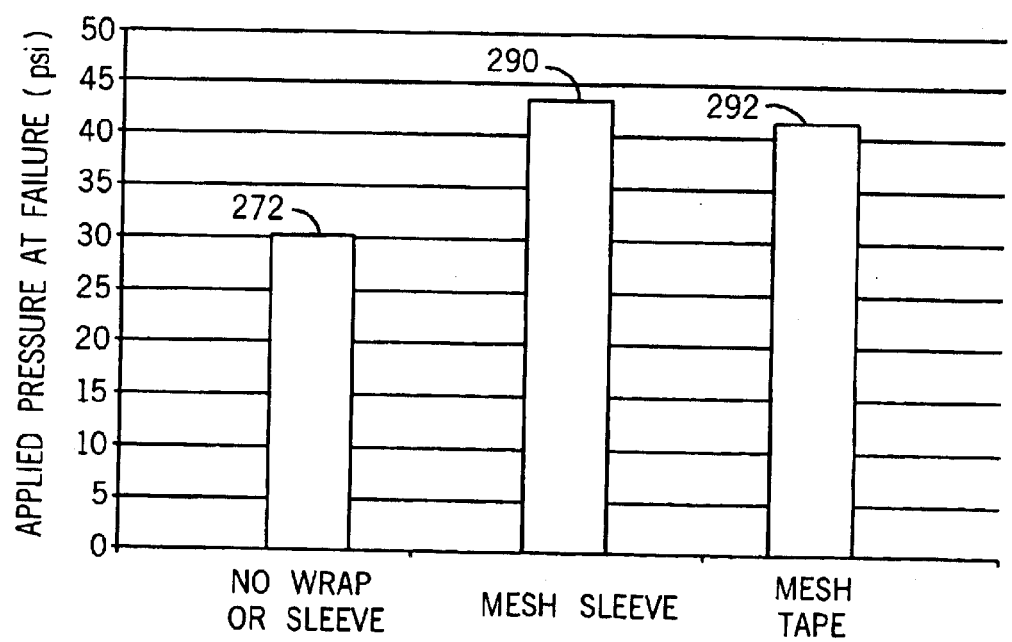

FILTER COATING, WINDING, FINISHING AND MANUFACTURING SYSTEM

BACKGROUND AND SUMMARY

The invention relates to fluted filter media coating, winding, finishing and manufacturing systems for filters including various fluid filters including air filters and including high temperature filters such as diesel exhaust aftertreatment filters.

The invention arose during continuing development efforts relating to air filters and to diesel exhaust aftertreatment filters. Various improved coating, winding, finishing and manufacturing apparatus, methods and systems have been developed, including: an improved coating system for applying adhesive to flute tips of a fluted filter media sheet including pleated filter media and corrugated filter media; an improved spiral-winding system for winding first and second sheets of filter media into a spiral-wound roll, the first sheet having a plurality of flutes defined by wall segments extending in zig-zag manner between flute tips at axially extending flute bend lines, the flute tips on one side of the first sheet being in contiguous relation with and adhesively bonded to the second sheet to define axial flow channels; an improved finishing system, including a tensioning system, for increasing and maintaining wound-in tension in the spiral-wound roll, including improvements minimizing axial separation of layers in the spiral-wound roll; an improved overall manufacturing process incorporating the noted systems in combination; and a cost effective manufacturing system for making plural spiral-wound filters.

BRIEF DESCRIPTION OF THE DRAWINGS

FIG. 6 is a side elevation schematic view of a manufacturing system in accordance with the invention.

FIG. 7 is a side elevation schematic view of a further manufacturing subsystem in accordance with the invention.

FIG. 9 is an enlarged view of a portion of FIG. 7.

FIG. 10 is a view like FIG. 9, after further roll-winding.

FIG. 11 is a view like FIG. 10, after yet further roll-winding.

FIG. 15 is a schematic exploded perspective view of a filter roll and a housing, illustrating axial separation failure.

FIG. 16 is a bar graph illustrating applied pressure at failure vs. the type of filter roll and outer wrap.

DETAILED DESCRIPTION

Figure 1:
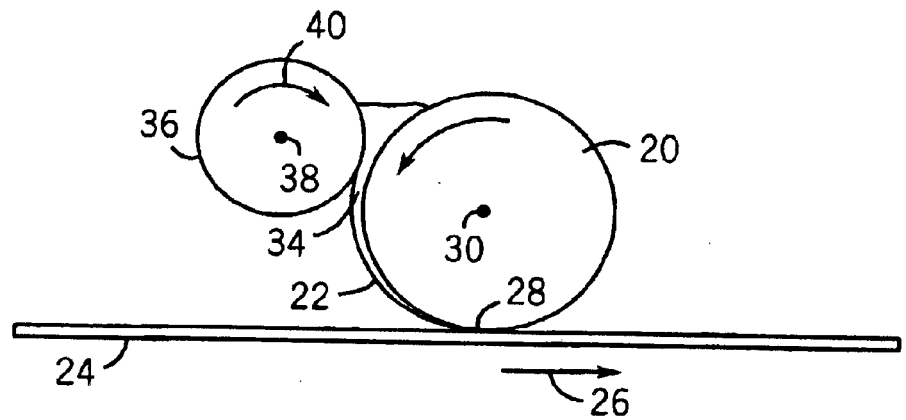
FIG. 1 is a side elevation schematic view of a coating system known in the prior art.
Figure 13:
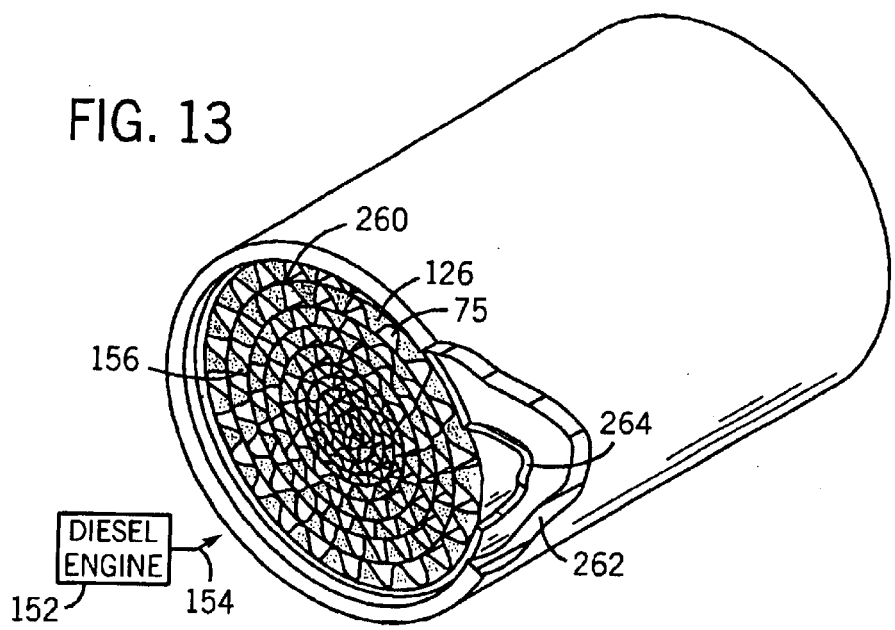
FIG. 13 is a schematic perspective view partially cut away of a filter roll in a housing.

In forming a spiral-wound filter roll, for example as shown in U.S. Pat. No. 6,444,006, incorporated herein by reference, and for example as shown in FIG. 13 herein, including for an air filter and including in the formation of a green uncured pre-form for subsequent curing to a high temperature filter, such as a diesel exhaust aftertreatment filter, it is necessary to apply adhesive to the flute tips of a fluted filter media sheet, including pleat tips of a pleated filter media sheet, or other corrugated sheet, for subsequent spiral-winding. For the present system, forward roll coating was selected. In forward roll coating, as known in the prior art as shown in FIG. 1, an applicator roll 20 applies a coating 22 to a substrate 24. The substrate is moving in a forward direction which is left to right in FIG. 1 as shown at arrow 26. The term "forward" roll coating means that applicator roll 20 and substrate 24 are moving in the same direction at their point of contact 28. Applicator roll 20 rotates about rotational axis 30 in a counterclockwise rotational direction as shown at 32. The coating thickness 22 is controlled primarily by adjusting the gap 34 between applicator roll 20 and a metering or doctor roll 36 which rotates about rotational axis 38 in a clockwise rotational direction as shown at 40. Metering roll 36 is thus counter-rotating relative to applicator roll 20. Other factors which affect coating thickness are viscosity of the coating material such as an adhesive, and surface tension and hydrostatic pressure before metering gap 34. In forward roll coating, applicator roll 20 and substrate 24 move at substantially similar speeds and in the same direction at their point of contact 28.

Figure 2:
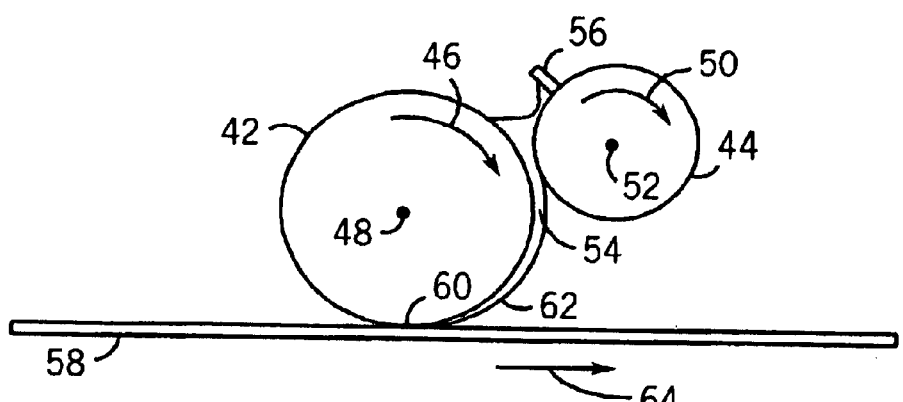
FIG. 2 is a side elevation schematic view of another coating system known in the prior art.

In assessing use of the forward roll coating system of FIG. 1 for applying adhesive to pleat tips of a pleated filter media sheet, such method does desirably allow control of the total weight of adhesive applied, however a non-uniform coating can result because of an unstable meniscus between the metering roll and the applicator roll. This instability results in ribs of thicker adhesive on an otherwise uniform coating. Alternative coating methods have been developed in the prior art which allow higher coating speeds without formation of ribs. One such method is reverse roll coating, FIG. 2. In reverse roll coating, applicator roll 42 and metering roll 44 are co-rotating relative to each other, i.e. applicator roll 42 rotates in a clockwise rotational direction 46 about its rotational axis 48, and metering roll 44 rotates in a clockwise rotational direction 50 about its rotational axis 52. The roller velocity vectors in gap 54 thus point in opposite directions. In order to prevent the metering roll 44 from introducing coating material after metering gap 54, a wiper 56 is used to clean coating material from metering roll 44. In "reverse" roll coating, applicator roll 42 and substrate 58 move in opposite directions at their point of contact 60. This results in nearly complete transfer of coating material 62 to substrate 58.

In assessing coating systems for applying adhesive to pleat tips of a pleated filter media sheet in accordance with the present invention, the noted reverse roll coating approach was rejected because it would be difficult to implement, due to the non-rigid nature of the pleated filter media sheet, particularly prior to lamination of such pleated sheet to a flat filter media sheet. The reverse motion of applicator roll 42 and the wiping action at point of contact 60 in a direction opposite to the forward direction 64 of movement of substrate 58 may distort the pleat geometry during adhesive application and result in non-uniform pleat spacing.

Figure 3:
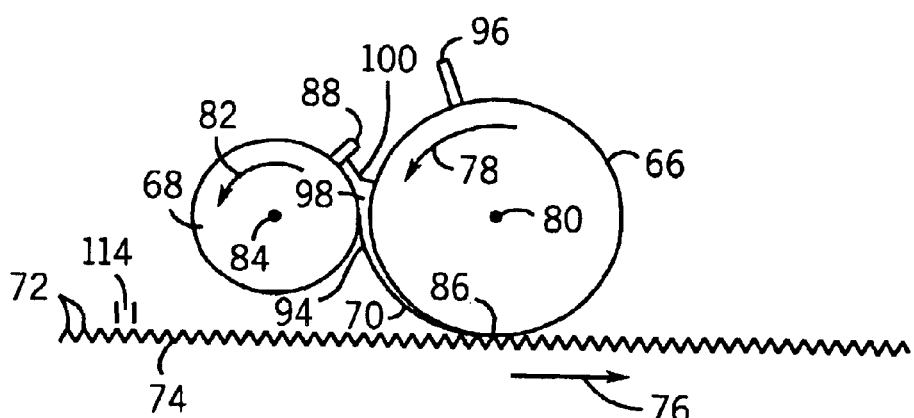
FIG. 3 is a side elevation schematic view of a coating system in accordance with the present invention.
Figure 4:
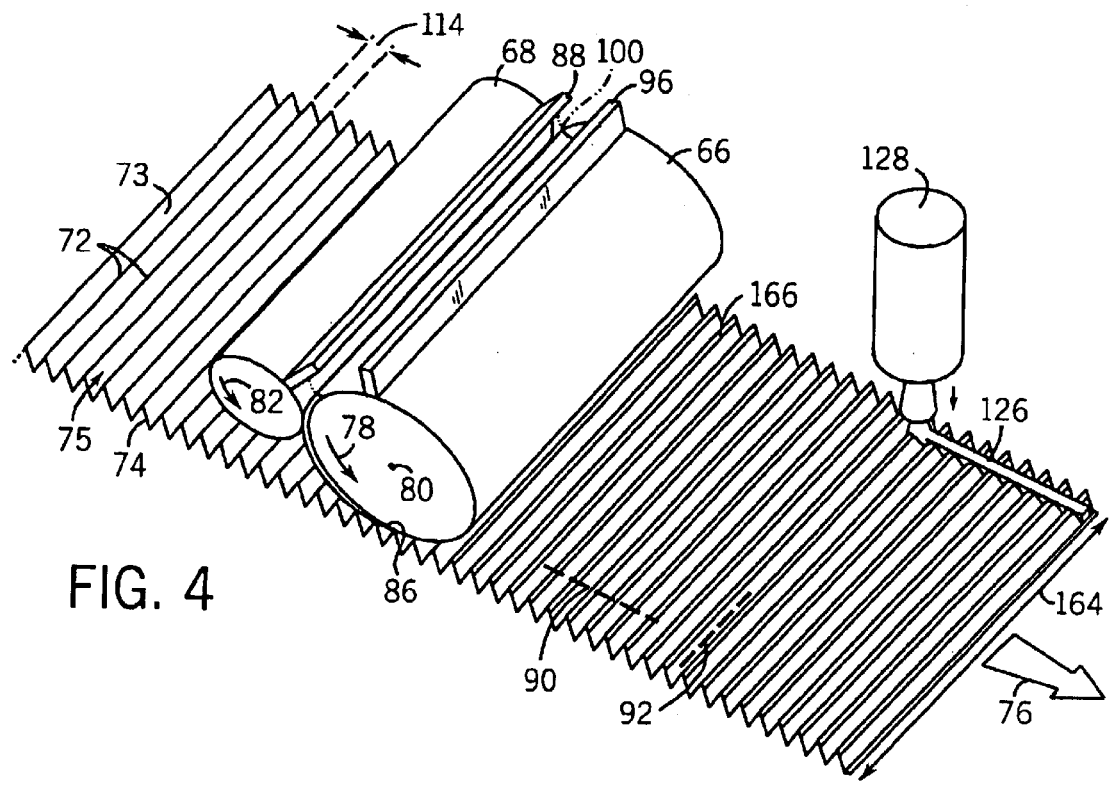
FIG. 4 is a schematic perspective view illustrating the system of FIG. 3.

In accordance with the present invention, a hybrid roll coating approach was developed, FIG. 3, using a forward roll coating applicator roll 66, but with a co-rotating metering roll 68 rather than a counter-rotating metering roll such as 36 of FIG. 1. In FIG. 3, and as also illustrated in FIG. 4, a coating system is provided for applying adhesive 70 to pleat tips 72 of a pleated filter media sheet 74 moving left to right in a forward direction 76. Applicator roll 66 rotates in a counterclockwise rotational direction 78 about its rotational axis 80. Metering roll 68 rotates in a counterclockwise rotational direction 82 about its rotational axis 84. Rotational axes 80 and 84 are on the same horizontal plane. Applicator roll 66 and pleated filter media sheet 74 move in the same direction at their point of contact 86. A wiper blade 88 is used on metering roll 68 as is done in conventional reverse roll coating, FIG. 2. With this approach and with trial and error control of metering roll speed, it was found that ribbing could be eliminated if cascading could be prevented. The noted ribs run in the machine direction, i.e. left to right in FIG. 3 and as shown at dashed line 90 in FIG. 4. Cascading appears as non-uniform transverse ribs which run perpendicular to the machine direction, i.e. into the page in FIG. 3 and along dashed line 92 in FIG. 4. Cascading is caused by movement of the meniscus through gap 94 between metering roll 68 and applicator roll 66. It has been found that at conditions close to the transition between ribbing 90 and cascading 92 that a smooth uniform coating 70 could be produced if the applicator roll is wiped, as at wiper 96 before again entering metering gap 94. Wiping can be complete or can just remove thickness non-uniformity prior to metering gap 94. Implementation of wiper 96 on applicator roll 66 in combination with the noted hybrid forward roll coating applicator roll 66 and co-rotating metering roll 68 resulted in a uniform coating. The hybrid approach of FIG. 3 retains the benefits of reverse roll coating of FIG. 2, including the applicator roll and metering roll velocity vectors in the metering gap 54, 94 being in opposite directions, and also maintains the advantages of forward roll coating of FIG. 1 which are particularly important for applying adhesive to pleat tips of a pleated filter media sheet, including that the applicator roll and the sheet move in the same direction at their point of contact 28, 86. Furthermore, the addition of extra wiper blade 96 provides the noted advantages for uniform coating and overcoming the phenomena of ribbing and cascading.

FIGS. 3 and 4 illustrate a coating system in accordance with the invention for applying adhesive 70 to pleat tips 72 of a pleated filter media sheet 74 moving in a forward direction 76. The system includes applicator roll 66 forward roll coating pleat tips 72 of pleated filter media sheet 74, and metering roll 68 metering adhesive to applicator roll 66 and co-rotating relative thereto. A first wiper blade 96 is provided on applicator roll 66, and a second wiper blade 88 is provided on metering roll 68. Applicator roll 66 applies adhesive 70 to pleat tips 72 of pleated filter media sheet 74 at point of contact 86. Pleated filter media sheet 74 and applicator roll 66 move in the same direction at point of contact 86. Metering roll 68 is spaced from applicator roll 66 by metering gap 94 therebetween defining a metering zone 98 including a reservoir 100 holding the adhesive in liquid form. The adhesive is applied from reservoir 100 to applicator roll 66 and metered through metering gap 94. Applicator roll 66 and metering roll 68 rotate in the same direction about respective spaced parallel rotation axes 80 and 84. Wiper blade 96 on applicator roll 66 is between sheet 74 and metering zone 98 along the rotational path of applicator roll 66 such that wiper blade 96 wipes applicator roll 66 after applicator roll 66 applies adhesive to pleat tips 72 of sheet 74 and prior to application of adhesive to applicator roll 66 in metering zone 98. In one embodiment, as noted above, wiper blade 96 completely wipes applicator roll 66 and removes all excess adhesive therefrom. In another embodiment, as above noted, wiper blade 66 partially wipes applicator roll 66 and leaves uniform thickness adhesive on applicator roll 66 such that applicator roll 66 enters metering zone 98 pre-coated with adhesive of uniform thickness. Second wiper blade 88 wipes metering roll 68 after metering roll 68 rotates through metering zone 98.

Figure 5:
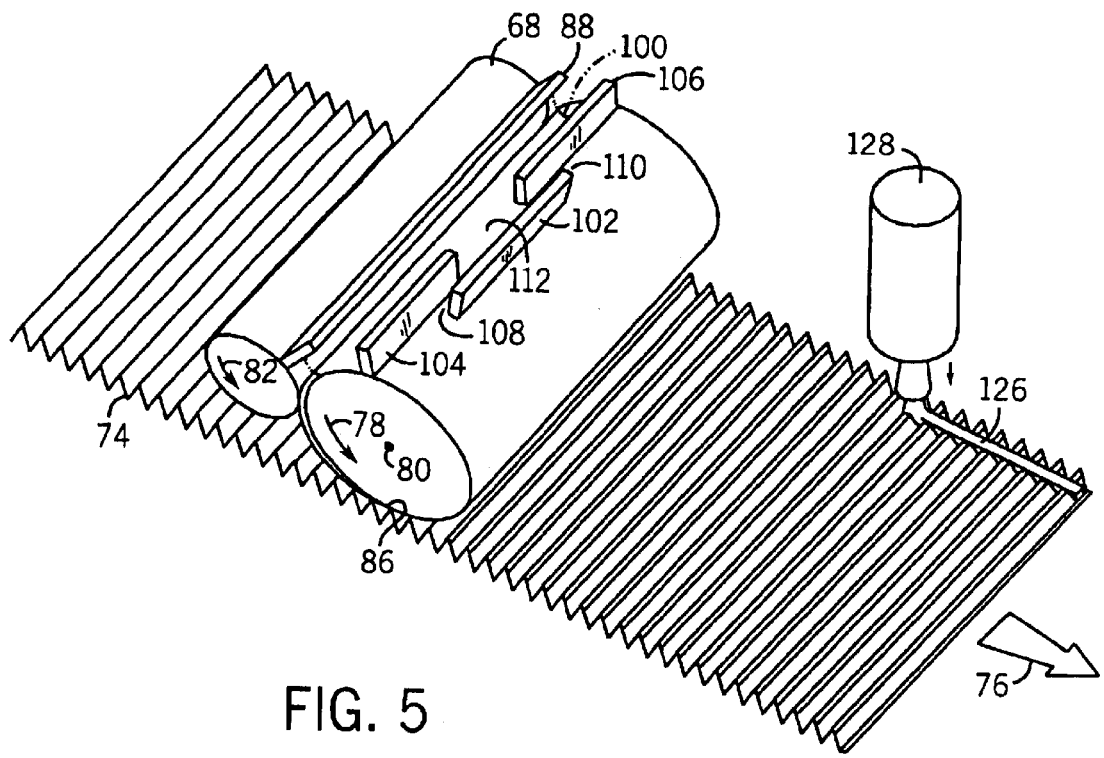
FIG. 5 is like FIG. 4 and shows an alternate embodiment.

FIG. 5 shows a further embodiment and uses like reference numerals from FIGS. 3 and 4 where appropriate to facilitate understanding. In FIG. 5, a plurality of wiper blades 102, 104, 106 are provided on applicator roll 66 in overlapped relation in the direction of rotation 78 of the applicator roll. At least two of the wiper blades, e.g. 102 and 104, and/or 102 and 106, etc., are arcuately spaced from each other about the axis of rotation 80 of applicator roll 66. The noted spaced wiper blades are spaced from each other by an arcuate gap 108 and/or 110, and adhesive flows through such arcuate gap into reservoir 100. In the embodiment of FIG. 5, three wiper blades 102, 104, 106 are used, including a first leading wiper blade 102, and second and third trailing wiper blades 104 and 106. Leading wiper blade 102 and trailing wiper blade 104 are arcuately spaced from each other about axis of rotation 80 of applicator roll 66 by a first arcuate gap 108. Leading wiper blade 102 and trailing wiper blade 106 are arcuately spaced from each other about axis of rotation 80 of applicator roll 66 by a second arcuate gap 110. Trailing wiper blades 104 and 106 are transversely spaced from each other by a transverse gap 112 therebetween. Transverse gap 112 is arcuately aligned with leading wiper blade 102. Adhesive wiped by leading wiper blade 102 flows through first and second arcuate gaps 108 and 110 and joins respectively with adhesive wiped by second and third trailing wiper blades 104 and 106 and flows through transverse gap 112 and into reservoir 100.

In FIGS. 3–5, pleat tips 72 extend along pleat lines transverse to forward direction of movement 76 of pleated filter media sheet 74 and parallel to rotational axis 80 of applicator roll 66. Pleated filter media sheet 74 and applicator roll 66 move at the same speed and in the same direction at point of contact 86 such that applicator roll 66 engages pleat tips 72 in static relation without translational sliding therealong and without altering pleat tip spacing 114.

FIG. 6 shows further pre- and post-processing of filter media sheet 74. The sheet is initially a flat planar member fed from a supply roll 116 around idler and supply pulleys 118 and 120 and then fed through a pleater such as a star gear pleater provided by a pair of star gears 122 and 124, for example as shown in co-pending U.S. patent application Ser. No. 09/935,847, filed Aug. 23, 2001, incorporated herein by reference. The pleated sheet may then be heated and dried if desired to better hold the pleat shape, and then fed to the coating station provided by applicator roll 66 and metering roll 68, as above described, to apply adhesive to pleat tips 72. For a wall-flow filter, sealant plugging material 126, FIG. 4, is then applied across and on top of one side of the sheet by dispenser 128 to fill the flutes or channels between the pleat tips at the respective axial ends of the channels. For a flow-through filter, no sealant is applied as at 126. Next, a second filter media sheet 130 is supplied from a supply roll 132 and pressed against the top of sheet 74 at pleat tips 72 by roller 134, to laminate sheets 74 and 130 together. Laminated sheets 74, 130 are then fed around pulley 136 and supplied to storage or take-up roll 138.

Figure 8:
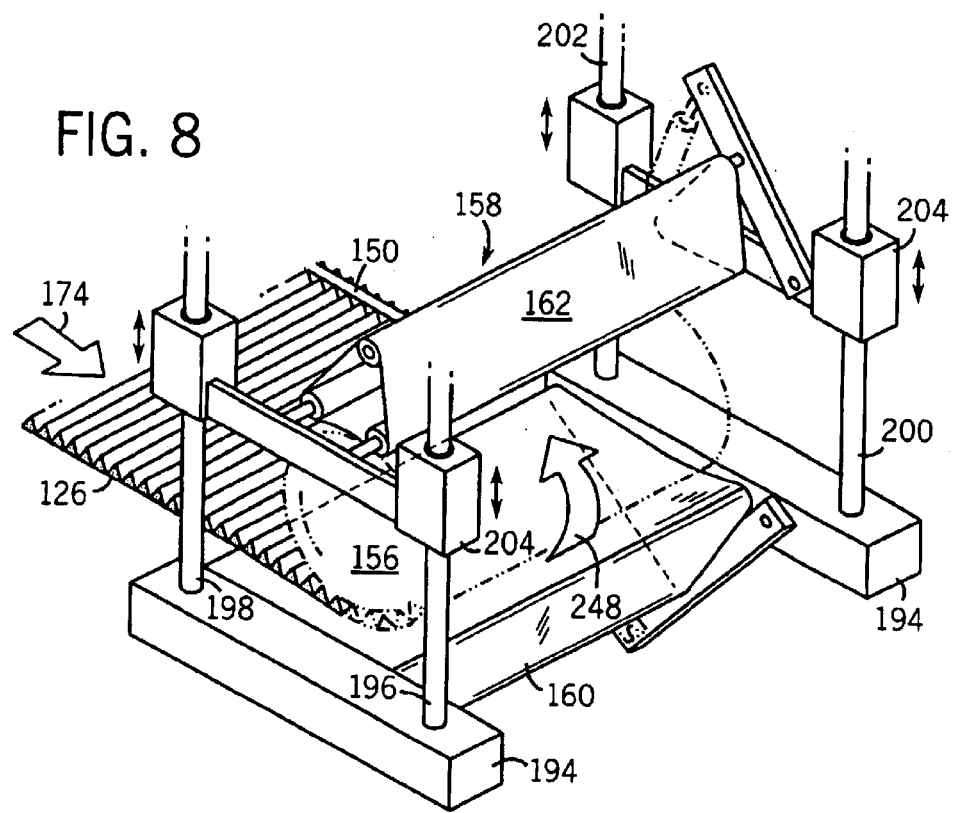
FIG. 8 is a schematic perspective view of a portion of FIG. 7.

After a given length or amount of laminated filter media is stored on roll 138, such roll is then removed and re-oriented, FIG. 7, such that roll 138 can be unwound with sheet 130 as the lower sheet, and the unlaminated pleat tips 140 from FIG. 6 now facing upwardly in FIG. 7. Sheets 74, 130 are unwound from roll 138 in FIG. 7 and fed around idler pulley 142 and then supply pulley 144, comparably to pulleys 118 and 120, respectively, in FIG. 6, and then supplied to another coating station provided by applicator roll 146 and metering roll 148, comparable to applicator roll 66 and metering roll 68, respectively, in FIG. 6. For a wall-flow filter, a dispenser 149, comparable to dispenser 128 in FIG. 6, then applies plugging sealant material as shown at strip 150, FIG. 8, across the top of sheet 74 filling the flutes or channels between pleat tips 140, comparably to plugging sealant 126, FIG. 4, but at the opposite axial ends of the channels, FIG. 8. For a flow-through filter, sealant plugging material 150 is not applied.

Sheets 74, 130 are then ready for spiral-winding into a spiral-wound roll 152, FIG. 13, and also as shown in the noted incorporated U.S. Pat. No. 6,444,006. In a wall-flow filter, opposite axial ends of the channels are alternately plugged with the noted sealant 126, 150, thus forcing flow through the walls of the channels, for example exhaust from diesel engine 152 flows axially into the filter as shown at 154, FIG. 13, through the open upstream axial ends of alternating channels, and then flows through the filter media, and then flows through the open downstream ends of the alternate set of flow channels, as is known. For diesel exhaust aftertreatment filters, sheets 74, 130 are spiral-wound while in a green uncured pliable pre-form state, after which the filter roll is cured to a high temperature filter, for example by pyrolization firing of pre-ceramic filter media material at a temperature >900° C., preferably about 1100° C., to a rigid ceramic filter, for example as described in the incorporated '006 patent. The spiral-wound filter roll pre-form is cured and rigidized to an exhaust aftertreatment filter for filtering engine exhaust from an engine such as diesel engine 152 flowing axially therethrough at 154. The cured and rigidized filter is regenerable by heat to burn-off contaminant particulate collected from the engine exhaust. The pre-form may be rigidized with sol-gel, chemical vapor infiltration, ceramic bond phase, silicon carbide, or in other suitable manner.

A spiral-winding system is provided for winding sheets 74, 130 into a spiral-wound roll 156, FIGS. 8–11, 13. Winding apparatus 158, FIGS. 7–11, uses first and second belts 160 and 162 to create a coreless, spiral-wound diesel particulate filter element in the noted green uncured preform state. The media used to create the filter is the noted dual layer laminated media provided by pleated corrugated sheet 74 and flat sheet 130 joined at pleat tips 72 by the noted adhesive along the entire axial length 164, FIG. 4, along axial bend line 166. Pleat tips 72 extend along pleat or flute bend lines 166 transverse to forward direction of movement 76 of pleated filter media sheet 74 and parallel to rotational axis 80 of applicator roll 66. Each pleat tip 72 has a length 164 along its respective pleat line 166, and the entire length 164 of the pleat tip 72 is coated with adhesive. Pleat tips 140 are likewise coated with adhesive along their entire length. The two belt winder places a flexible upper belt 162 and a flexible lower belt 160 across the width 164 of the media which allows for continuous pressure along the length of the pleat. Several narrow belts could also be used, but this is not preferred because of possible uneven pressure applied by the belts. In assessing possible use of prior two drum winders, several drawbacks were noted. The winding media, namely pleated sheet 74 and flat sheet 130 bonded together, cannot support a high load without crushing the pleats. The nip force created by the upper roller can cause crushing of the pleated laminated media. This nip force is distributed over a larger area with a two belt winder, thus reducing pressure on the laminated pleated media. A frictional force applied to the filter element is required to rotate the element during roll-winding. The frictional force that can be applied on a two drum winder is low due to the low surface area in contact with the filter element. On the other hand, on a two belt winder, the frictional force between the belts and the winding element can be increased due to the increased area and force that can be applied across the broad belt. On a two drum winder, it is necessary to have the drums close together in order to start or wind a small diameter filter element. As the element grows, as seen in sequence in FIGS. 9–11, it is desirable to have the drums farther apart. The two belt winder does not encounter this problem because the belt fills in the gap between the drums and conforms to the growing filter element.

Spiral-winding system 158 includes the noted first and second spaced belts 160 and 162 having a gap 170 therebetween, FIGS. 7, 9 defining a winding zone 172 receiving filter media sheets 74, 130. Sheet 130 faces and engages lower belt 160. Sheet 74 faces upper belt 162. Sheets 74, 130 roll-wind in winding zone 172 such that sheet 130 is engaged by upper belt 162 to roll-wind the sheets into a spiral-wound roll. Belts 160 and 162 face each other in parallel relationship in winding zone 172. Sheets 74, 130 move in a forward direction 174 into winding zone 172. Belt 160 at belt segment 176, FIG. 9, travels forwardly in winding zone 172 parallel to forward direction 174. Belt 162 at belt segment 178 travels rearwardly in winding zone 172 parallel to and in the opposite direction to forward direction 174. Each belt is initially rectilinear in winding zone 172, as shown at segments 176, 178, FIG. 9, and flexes to concave curvature upon roll-winding, FIGS. 10, 11. The concave curvature has a continually positive radius of curvature without negative inflection.

Lower belt 160 is trained around a first set of rollers 180, 182, 184. Upper belt 162 is trained around a second set of rollers 186, 188, 190. At least one of the sets of rollers is mounted on a carriage moveable toward and away from gap 170 and winding axis 192 of filter roll 156. The first set of rollers 180, 182, 184 is mounted on a lower carriage 194 having guide rails 196, 198, 200, 202 extending upwardly therefrom. The upper set of rollers 186, 188, 190 is mounted on a second carriage 204 mounted on and moveable along the guide rails toward and away from gap 170 and winding axis 192. Lower carriage 194 is gravitationally below upper carriage 204. Upper carriage 204 is lifted away from gap 170 and winding axis 192 by filter roll 156 during the noted roll-winding such that wound-in tension is applied to roll 156 by carriage 204 by the gravitational weight of such carriage. Additional tension may be applied or removed if desired, for example by applying an additional downward or upward force at 206 on upper extension 208 of the carriage.

First and second rollers 180 and 182 of the noted first set lie in a first rectilinear plane parallel to the noted forward direction 174. Third roller 184 of the noted first set is below such first rectilinear plane. First and second rollers 186 and 188 of the noted second set lie in a second rectilinear plane above and parallel to the noted first rectilinear plane. Third roller 190 of the noted second set is above the noted second rectilinear plane. First belt 160 travels forwardly in winding zone 172 from first roller 180 of the first set to second roller 182 of the first set and is initially rectilinear, FIG. 9, in winding zone 172 along the noted first rectilinear plane, and then flexes downwardly, FIGS. 10, 11, to a concave curvature upon the noted roll-winding. Second belt 162 travels rearwardly in winding zone 172 from first roller 186 of the noted second set to second roller 188 of the noted second set and is initially rectilinear, FIG. 9, in winding zone 172 along the noted second rectilinear plane, and then flexes upwardly, FIGS. 10, 11, toward third roller 190 of the noted second set to a concave curvature upon the noted roll-winding. A first lower arm 210 has first and second spaced journals 212 and 214. First journal 212 is pivotally mounted to carriage 194, and second journal 214 is journaled to third roller 184 of the noted first set. A first pivot control member 216 is provided by a cylinder with an extensible plunger 218 controlling the amount of pivoting of arm 210 about journal 212 to control tension in belt 160. One end of the cylinder is mounted to carriage 194 at pivot 220, and the distally opposite end of the plunger is mounted to arm 210 at pivot 222. A second arm 224 has first and second spaced journals 226 and 228. First journal 226 of second arm 224 is pivotally mounted to second carriage 204, and second journal 228 of second arm 224 is journaled to third roller 190 of the noted second set. A second pivot control member 230, provided by a cylinder with an extensible plunger 232, controls the amount of pivoting of second arm 224 about journal 226 to control tension in belt 162. One end of the cylinder is connected to carriage 204 at pivot 234, and the distally opposite end of plunger 232 is connected to arm 224 at pivot 236.

Figure 12:
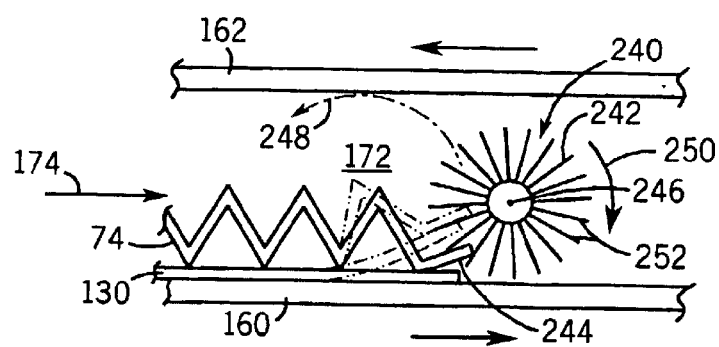
FIG. 12 is a further enlarged view of a portion of FIG. 7.

Spiral-wound filter roll 156 is coreless, and sheets 74, 130 roll-wind in winding zone 172 without a mandrel. A roll-starter 240, FIGS. 9, 12, in winding zone 172 starts the roll-winding of sheets 74, 130 without a mandrel. The roll-starter includes an engagement member 242 having a first position extending between belts 160 and 162 in winding zone 172 and engaging sheets 74, 130 and starting the roll-winding. The roll-starter is preferably removed from winding zone 172 once the roll-winding has started. Alternatively, the roll-starter can be allowed to float and ride on the outer layer of the filter roll as it winds. The roll-starter in the second position, namely either removed from winding zone 172 or permitted to float along the outer circumference of the winding roll, permits the noted roll-winding. Sheets 74, 130 have a forward leading edge 244, FIG. 12, entering winding zone 172 and engaged by engagement member 242 in the noted first position. Engagement member 242 in the noted second position is disengaged from and spaced from leading edge 244. Roll 156 spiral-winds around the noted winding axis 192, FIG. 10. Roll-starter 240 is provided by rotary engagement member 242 in winding zone 172 rotating about a rotational axis 246 and engaging sheets 74, 130 and starting the noted roll-winding. Rotational axis 246 is parallel to winding axis 192. Roll 156 roll-winds about winding axis 192 in a first rotational direction as shown in phantom line at 248 in FIG. 12 and in solid line at 248 in FIG. 8. Rotary engagement member 242 rotates about rotational axis 246 in a second rotational direction 250 opposite to rotational direction 248. Rotary engagement member 248 is provided by a rotary brush rotating about rotational axis 246 and having a plurality of bristles 252 extending radially outwardly therefrom and gripping leading edge 244 and re-directing such leading edge rearwardly in curled-over relation, FIGS. 7, 9, to initiate the roll-winding. In an alternate embodiment, sheets 74, 130 have a forward leading edge turned-over on itself in a J-shape to provide the roll-starter.

The sheets 74 and 130 of filter media are wound in tension in a spiral about winding axis 192 to a spiral-wound roll 156. Sheet 74 has the noted plurality of pleats defined by wall segments 73 extending in zig-zag manner between pleat tips 72 at axial extending bend lines 166 parallel to winding axis 192, the pleat tips 72 on one side of sheet 74 being in contiguous relation with sheet 130 to define axial flow channels 75. At least one of the carriages, such as carriage 204, is moveable toward and away from winding axis 192 to permit growth of roll 156 during spiral-winding without crushing wall segments 73 between the pleat tips.

Wound-in tension in filter roll 156 is significant in maintaining structural integrity of the finished element when subjected to flow, including exhaust flow, through the element along axial direction 154, FIG. 13. Wound-in tension of the element can be controlled by: torque differential between upper and lower belts 162 and 160; down force imparted by upper belt 162, i.e. nip force; tension on the incoming media sheets 74, 130; and tension on the belts 160, 162. Upper carriage 204 can be supported by the wound element 156. Additional control of the force imparted by upper belt 162 can be accomplished by adding or removing force through mechanical or pneumatic means, for example at 206. It is advantageous to increase the wound-in tension as the element grows in diameter due to the dynamics of the element when in use. Wound-in tension can be altered as the element is wound by monitoring the diameter of the wound filter roll and adjusting the factors noted above.

During winding, filter roll 156 has a tendency to travel in the direction of the incoming media, i.e. leftwardly in FIGS. 10 and 11, when the belts 160 and 162 are traveling at the same speed. This is due to the difference in radius of the lower portion of the wound filter element roll 156 and the upper portion of roll 156. The larger radius is a result of the incoming media at sheets 74, 130 feeding onto the lower portion of roll 156, and is related to the thickness of the incoming media, particularly pleat height, i.e. the height of wall segments 73. It may be necessary to control this tendency of the element to travel leftwardly in FIGS. 10 and 11 and otherwise move out of winding zone 172. This can be accomplished in several ways. The upper drive belt can have a slightly lower speed than the lower belt 160, which speed differential needs to be changed as element 156 grows in diameter from FIG. 9 through FIG. 11, since the tendency of the filter roll element 156 to travel leftwardly is related to the ratio of the upper radius of such roll to the lower radius of such roll. This ratio approaches 1 as the element grows. In an alternative, the element filter roll to belt contact area can be allowed to slip. In another alternative, the upper belt 162 can drive the lower belt 160 through rotation of element 156 by either removing a mode of drive force on one of belts or through a ratcheting drive. In this latter alternative, it is preferred that the element be constrained from walking out of the belts by the belt rollers or other bars.

It is desirable that the finished filter roll element 156 have flat flush ends 260, FIG. 13, i.e. non-dished. The desired flatness and lack of dishing can be controlled by monitoring the location of the incoming media and moving the winding apparatus horizontally into and out of the page in FIGS. 9–11 to remain in line with the incoming media sheets 74, 130 and/or monitoring the horizontal location of element 156 and moving or changing the angle of the incoming media sheets 74, 130 and/or using rigid guides to control the location of the incoming media sheets 74, 130 and the element 156 being wound.

The winding process is started by roll-starter 240 which in the preferred embodiment is a long, small diameter, cylindrical brush, e.g. like a pipe cleaner, between the belts in gap 170 and rotating in the same direction as the belts. Belts 160 and 162 are brought into close proximity to each other but with sufficient space to feed in the laminated media provided by sheets 74, 130, and feeding the laminated media until it contacts rotating brush 242. The winding of element 156 is typically started with the upper and lower belts traveling at the same rate of speed. The position of wound element 156 is monitored and the speed of the upper belt 162 is adjusted to maintain the position of winding element 156 in the center of the belts. The upper and lower belt tension and nip force are kept relatively high until the roll core is formed, to assure that there are no gaps or holes in the core. The belt tensions and nip force are then reduced after the core reaches about 1" in diameter, to guard against crushing of the media. The nip force is then gradually increased as the element grows, to increase the wound-in tension towards the outside of the element, i.e. in the outer layers, where strength is particularly significant in exhaust aftertreatment applications, to be further discussed. A larger diameter outer layer is able to support a higher nip force due to the increased circumferential area.

Figure 14:
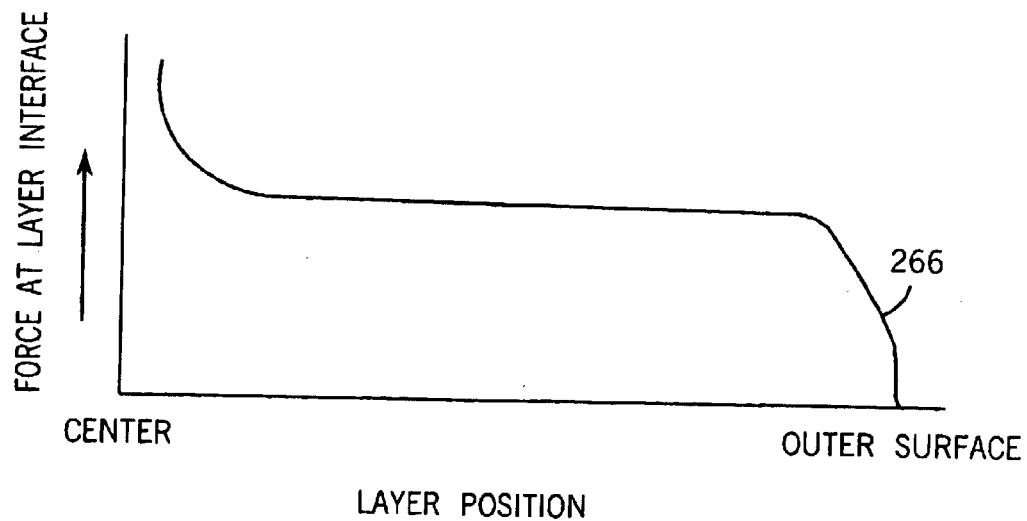
FIG. 14 is a graph illustrating force vs. layer position.

The present system further provides an apparatus and method for increasing and maintaining wound-in tension in the outer layers of a spiral-wound green uncured pre-form for curing to a high temperature filter including a diesel particulate filter. It is desirable to increase the wound-in tension or force between layers in the spiral-wound element, particularly in the outermost layers where pleat tip stresses are highest during operation. Winding physics dictate that the wound-in tension in the outermost layers should be zero as they constitute a free surface. FIG. 14 illustrates force at layer interface vs. layer position. Force at the center layers is highest, and force at the outer layers is lowest. After the noted curing of the spiral-wound filter roll 156 to a rigidized filter, it is mounted in a housing 262, FIG. 13. An annular mat 264 of compressible thermally insulative material is provided around filter 156 in housing 262. The mat is radially compressed between housing 262 and filter 156 and axially frictionally retains filter 156 in housing 262. Because of the noted low interlayer force at the outer layers as shown at 266 in FIG. 14, and the low tension on the outermost layer, the filter is subject to axial separation failure between outer layers at the interface between such layers and also at the outermost layer at the interface between such outermost layer and mat 264. During testing, axial pressure was applied against axial end face 260 by an air bladder, and axial separation failure 270 was observed, FIG. 15, at 30 psi as shown at 272, FIG. 16.

Figure 17:
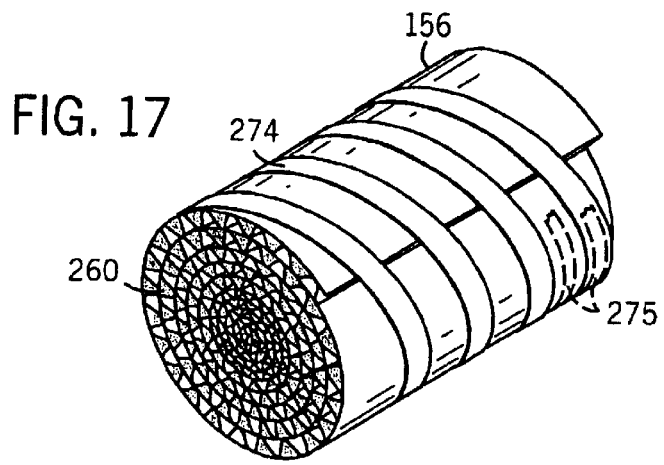
FIG. 17 is a schematic perspective view of a spiral-wound filter roll with an outer wrap.
Figure 18:
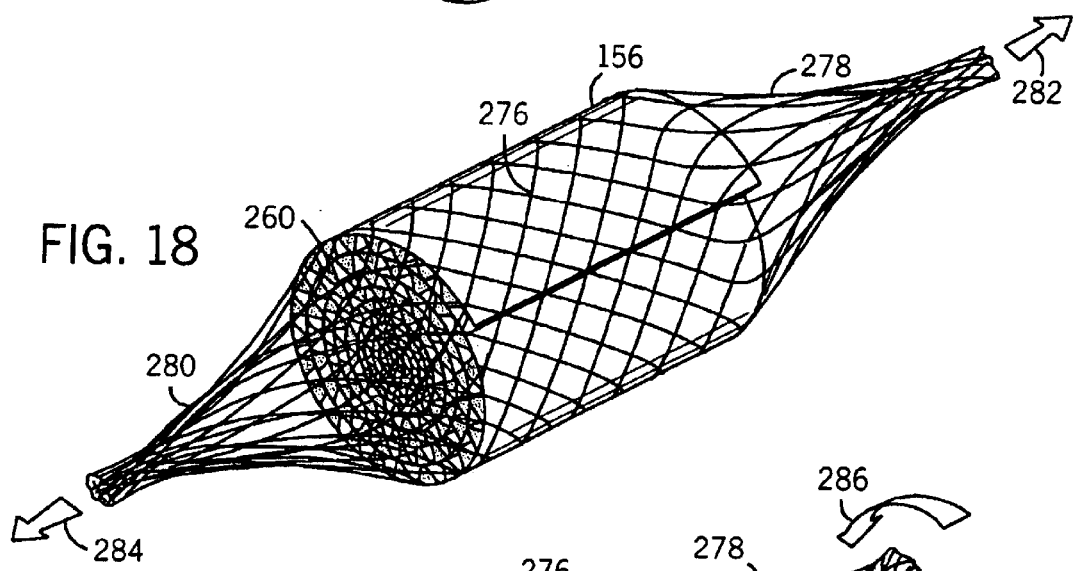
FIG. 18 is like FIG. 17 and shows an alternate embodiment.

To solve the noted axial separation failure problem, an outer wrap 274, FIG. 17, 276, FIG. 18, is provided around filter roll 156 maintaining wound-in tension in the spiral-wound roll during the noted curing. As above noted, for an exhaust aftertreatment filter, the filter media is regenerable and preferably provided in the green uncured pre-form state by pre-ceramic material which is then cured by pyrolization firing at a temperate >900° C., preferably about 1100° C., to a rigid ceramic filter, for example as described in the incorporated '006 patent. As noted above, the pre-form may be rigidized with sol-gel, chemical vapor infiltration, ceramic bond phase, silicon carbide, or in other suitable manner. The outer wrap 274 or 276 on the outer surface of green filter element roll 156 maintains the roll in compression, increasing the wound-in tension in the outer layers, which improves and stabilizes the bond between the noted pleat tips and flat sheet 130.

In one embodiment, the outer wrap is a mesh tape 274 wound around roll 156. The tape is under circumferential tension and provides a radial compressive force on roll 156 and increased wound-in tension in outer spiral layers such as 268 of the roll. The tape is porous to impregnating solution, to enable impregnation of the pre-form with the solution prior to curing, for example with the above noted sol-gel, chemical vapor infiltration, ceramic bond phase, silicon carbide, etc. The cured rigidized filter roll 156 is mounted in housing 262 as noted above. Annular mat 264 around filter 156 in housing 262 is radially compressed between the housing and the filter and axially frictionally retains the filter in the housing. Tape 274 creates a roughened surface thereat on filter roll 156, after the noted curing, providing an increased co-efficient of friction between mat 264 and filter 156. In one embodiment, tape 274 remains on filter roll 156 after curing and creates the noted roughened surface. In this embodiment, tape 274 is a high temperature tape and survives the noted pyrolization firing and remains on roll 156 after such firing and creates the noted roughened surface. In another embodiment, the tape is incinerated during the noted firing, and leaves behind the noted roughened surface. The increased wound-in tension afforded by outer wrap 274, particularly at outer layers 268, minimizes the noted axial separation failure 270 between wound layers. The noted roughened surface minimizes axial separation failure due to slippage between the outer surface of filter roll 156 and mat 264. In another embodiment, outer wrap or tape 274 is replaced by a helical coil or compression spring in tension, as shown in dashed line at 275, imparting a radial force on roll 156.

Figure 19:
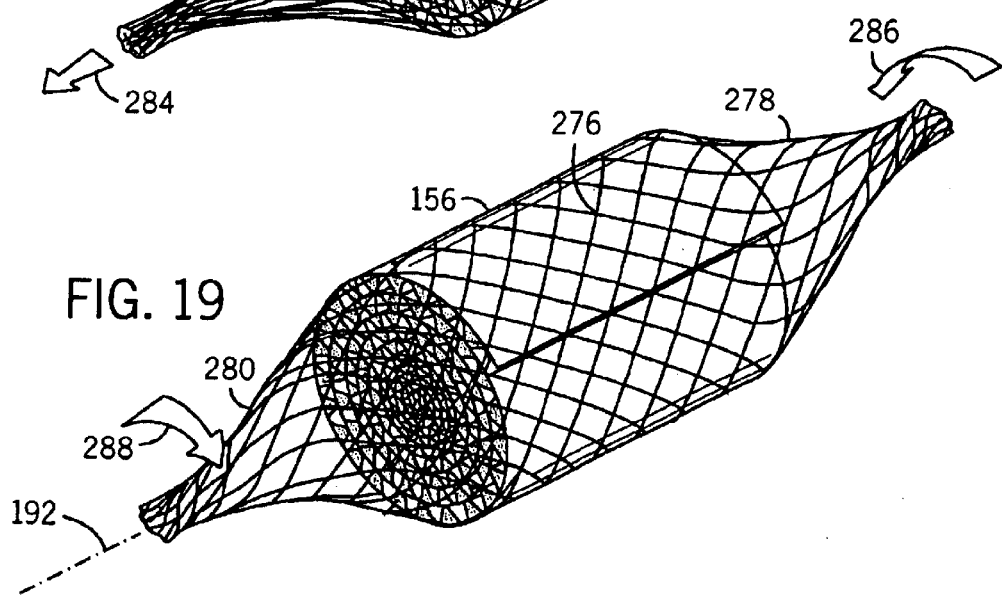
FIG. 19 is like FIG. 18 and shows a further embodiment.

In another embodiment, the outer wrap is provided by sleeve 276, FIG. 18, around roll 156. Sleeve 276 is a mesh or net applying radially compressive force on roll 156 and increased wound-in tension in outer spiral layers 268 of the filter roll. Sleeve 276 is an annular member and has axial ends 278 and 280 extending axially beyond roll 156. Ends 278 and 280 are axially stretched apart in distally opposite axial directions as shown at 282 and 284, respectively, to place such axial ends under axial tension to in turn draw down sleeve 276 onto and around roll 156 to provide a radial compressive force on the roll and increased wound-in tension in outer spiral layers 268 of the roll. In another embodiment, FIG. 19, axial ends 278 and 280 are twisted about winding axis 192, as shown at 286 and 288, such that twisted axial ends 278, 280 provide axial and radial tension which in turn draws down sleeve 276 onto and around roll 156 to provide a radial compressive force on the roll and increased wound-in tension in outer spiral layers 268 of the roll. Sleeve 276 is porous to impregnating solution, as noted above, to enable impregnation of the pre-form with solution prior to the noted curing. In one embodiment, sleeve 276 is composed of expanded metal. In a further embodiment, sleeve 276 is elastic and can accommodate potential tolerance deviations or shrinkage during curing, and still maintain the noted radial compressive force and increased wound-in tension. Other means for mechanically compressing the sleeve may be provided. A roughened surface on roll 156 is created by sleeve 276, including after curing, to provide an increased co-efficient of friction between mat 264 and filter roll 156. In one embodiment, sleeve 276 is a high temperature sleeve and survives the noted pyrolization firing and curing and remains on roll 156 after such firing. In another embodiment, sleeve 276 is incinerated during the noted firing and leaves behind the noted roughened surface. In further embodiments, the outer wrap or sleeve 276 increases the isostatic strength of the filter roll element or the load bearing ability of the exterior of the element. Such outer wrap can be a media sheet similar to sheet 130 or a material that will withstand the rigidization process to provide a protective outer shell. In further embodiments, the outer wrap is tapered in the circumferential direction if desired to compensate for irregular roundness of the outside of the filter roll element caused by the end 157 of spiral-wound roll 156, for example by a clay-like material for the outer wrap.

Sleeve 276, as with sleeve or coil or tape 274, applies radial compressive force on roll 156 and increased wound-in tension in outer spiral layers 268 of the filter roll to increase axial frictional holding force between spiral-wound layers and minimize axial separation thereof otherwise occurring as at 270, FIG. 15. The outer wrap provided by sleeve 276 or tape 274 also provides a roughened surface on roll 156, after curing, to increase axial frictional holding force between mat 264 and filter roll 156 and minimize axial separation thereof. The combination of the noted minimized axial separation between spiral-wound layers and the minimized axial separation between mat 264 and filter roll 156 provides an axially stable filter in housing 262. FIG. 16 shows the improved performance at 290 provided by mesh sleeve 276 which does not exhibit axial separation failure between layers until 43 psi, and the improved performance at 292 provided by mesh tape 274 which does not exhibit axial separation failure between layers until 41 psi. The noted axial separation failure is sometimes called telescoping failure.

The present system provides a coating method for applying adhesive 70 to pleat tips 72 of a pleated filter media sheet 74 moving in a forward direction 76, including providing an applicator roll 66 and forward roll coating the pleat tips 72 of the pleated filter media sheet 74, providing a metering roll 68 and metering adhesive to the applicator roll 66, co-rotating the metering roll 68 relative to the applicator roll 66, applying adhesive from the applicator roll 66 to the pleat tips 72 of the pleated filter media sheet 74 at a point of contact 86, moving the pleated filter media sheet 74 in the same direction as the applicator roll 66 at the point of contact 86, spacing the metering roll 68 from the applicator roll 66 by a metering gap 94 therebetween defining a metering zone 98 including a reservoir 100 holding adhesive, applying adhesive from reservoir 100 to applicator roll 66 and metered through metering gap 94, and rotating the applicator roll 66 and the metering roll 68 in the same direction about respective spaced parallel rotation axes 80 and 84.

The system provides a spiral-winding method for winding first and second sheets 74 and 130 of filter media into a spiral-wound roll 156, the first sheet 74 having a plurality of pleats defined by wall segments 73 extending in zig-zag manner between pleat tips 72, 140 at axially extending bend lines 166, the pleat tips 72 on one side of the first sheet 74 being in contiguous relation with the second sheet 130 to define axial flow channels 75, providing first and second belts 160 and 162 having a gap 170 therebetween defining a winding zone 172, one of the sheets 130 facing and engaging the first belt 160, the other of the sheets 74 facing the second belt 162, translating each belt 160, 162 rectilinearly, FIG. 9, in the winding zone 172, roll-starting 240 the sheets 74, 130 to roll-wind the sheets in winding zone 172 such that the one sheet 130 is engaged by the second belt 162 to roll-wind the sheets 74, 130 into a spiral-wound roll 156, flexing each belt 160, 162 from an initially flat rectilinear extension, FIG. 9, to concave curvature, FIGS. 10, 11, upon the noted roll-winding. The first and second sheets of filter media 74 and 130 are wound in tension in a spiral about a winding axis 192 to spiral-wound roll 156, the first sheet 74 having the noted pleat tips at the noted axially extending bend lines parallel to winding axis 192. The method involves training the first belt 160 around a first set of rollers 180, 182, 184, training the second belt 162 around a second set of rollers 186, 188, 190, mounting at least one of the sets of rollers on a carriage 204 moveable toward and away from the winding axis 192, and permitting growth of the roll 156 during spiral-winding without crushing the wall segments 73 between the pleat tips 72, 140 by moving carriage 204 away from winding axis 192.

The system provides a method for maintaining wound-in tension in the spiral-wound roll 156 during curing of the green pre-form to a high temperature filter, particularly for diesel exhaust aftertreatment, the pre-form including first and second sheets 74 and 130 of regenerable filter material wound in tension in a spiral about winding axis 192 to a spiral-wound roll 156, the first sheet 74 having the noted plurality of pleats defined by wall segments 73 extending in zig-zag manner between pleat tips 72, 140 at axially extending bend lines parallel to winding axis 192, the pleat tips 72 on one side of first sheet 74 being contiguous relation with second sheet 130 to define axial flow channels 75, the method including providing an outer wrap 274, 276 around the roll 156 and maintaining wound-in tension in the spiral-wound roll 156 during curing. The method further includes mounting the filter 156 in a housing 262 after curing, providing an annular mat 264 around filter 156 in the housing 262, the mat 264 being radially compressed between the housing 262 and the filter 156 and axially frictionally retaining the filter 156 in the housing 262, and providing a roughened surface on the roll 156, after the noted curing, created by the outer wrap, 274, 276, providing an increased co-efficient of friction between the mat 264 and the filter 156. The system further includes a method for axially stabilizing the filter 156 in the housing 262, including applying radial compressive force on the roll 156 by the outer wrap 274, 276 and increased wound-in tension in outer spiral layers 268 of the roll 156 to increase axial frictional holding force between layers and minimize axial separation 270 thereof, providing a roughened surface on the outer circumference of roll 156 by the outer wrap 274, 276, after the noted curing, to increase axial frictional force between the mat 264 and the filter 156 and minimize axial separation thereof. The combination of the minimized axial separation between layers 268 and the minimized axial separation between mat 264 and filter 156 provides an axially stable filter in the housing 262.

The system further provides a method for making a high temperature filter including providing a first sheet 74 of regenerable filter media, pleating 122, 124 the first sheet 74 to form a plurality of pleats defined by wall segments 73 extending in zig-zag manner between first and second sets of pleat tips 72 and 140 at axially extending bend lines 166, providing an applicator roll 66 and applying adhesive 70 to the pleat tips 72 of the first set by forward roll coating, providing a metering roll 68 metering adhesive to the applicator roll 66, providing a second sheet of regenerable filter media 130 and applying 134 the second sheet 130 to the pleat tips 72 of the first set such that the pleat tips 72 of the first set are in contiguous relation with and adhesively bonded to the second sheet 130 to define axial flow channels, providing a second applicator roll 146 and applying adhesive to the pleat tips 140 of the second set by forward roll coating, providing a second metering roll 148 metering adhesive to the second applicator roll 146, spiral-winding 158 the first and second sheets 74 and 130 into a spiral-wound roll 156 with first and second spaced belts 160 and 162 having a gap 170 therebetween defining a winding zone 172, wherein the first and second sheets 74 and 130 are fed forwardly 174 into the winding zone 172 such that the second sheet 130 engages the first belt 160, and the second set of pleat tips 140 faces the second belt 162, and roll-winding 248 the first and second sheets 74 and 130 in the winding zone 172 such that the second sheet 130 is engaged by the second belt 162 to roll-wind the first and second sheets 74 and 130 into a spiral-wound roll 156, with the pleat tips 140 of the second set adhesively bonded to the second sheet 130, and providing an outer wrap 274, 276 around the roll 156 for maintaining wound-in tension in the spiral-wound roll 156 during curing. The method further includes mounting the filter 156 in a housing 262 after the noted curing, providing an annular mat 264 around the filter 156 in the housing 262, the mat 264 being radially compressed between the housing 262 and the filter 156 and axially frictionally retaining the filter 156 in the housing 262, applying radially compressive force on the roll 156 with the outer wrap 274, 276 and increased wound-in tension in outer spiral layers 268 of the roll 156 during curing to increase axial frictional holding force between the layers 268 and minimize axial separation 270 thereof after curing, providing a roughened surface on the roll 156 with the outer wrap 274, 276, after curing, to increase axial frictional holding force between the mat 264 and the filter 156 and minimize axial separation thereof, such that the combination of the minimized axial separation between layers 268 and the minimized axial separation between the mat 264 and the filter 156 provides an axial stable filter in the housing 262.

Figure 20:
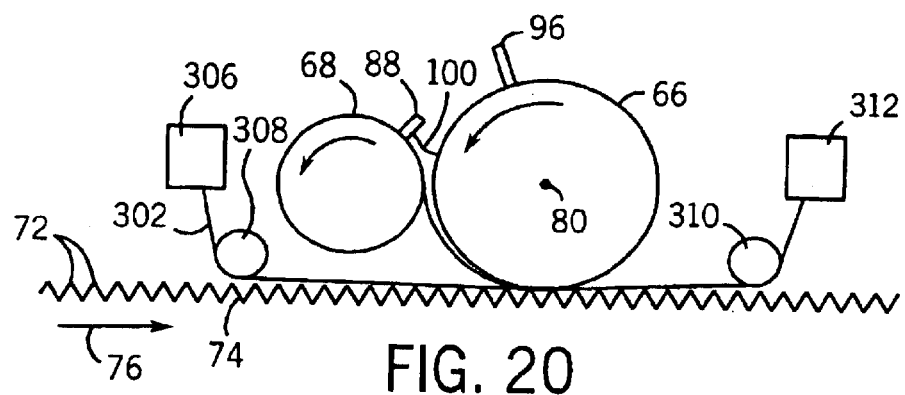
FIG. 20 is a view similar to portions of FIGS. 6 and 3, and shows a further embodiment.
Figure 21:
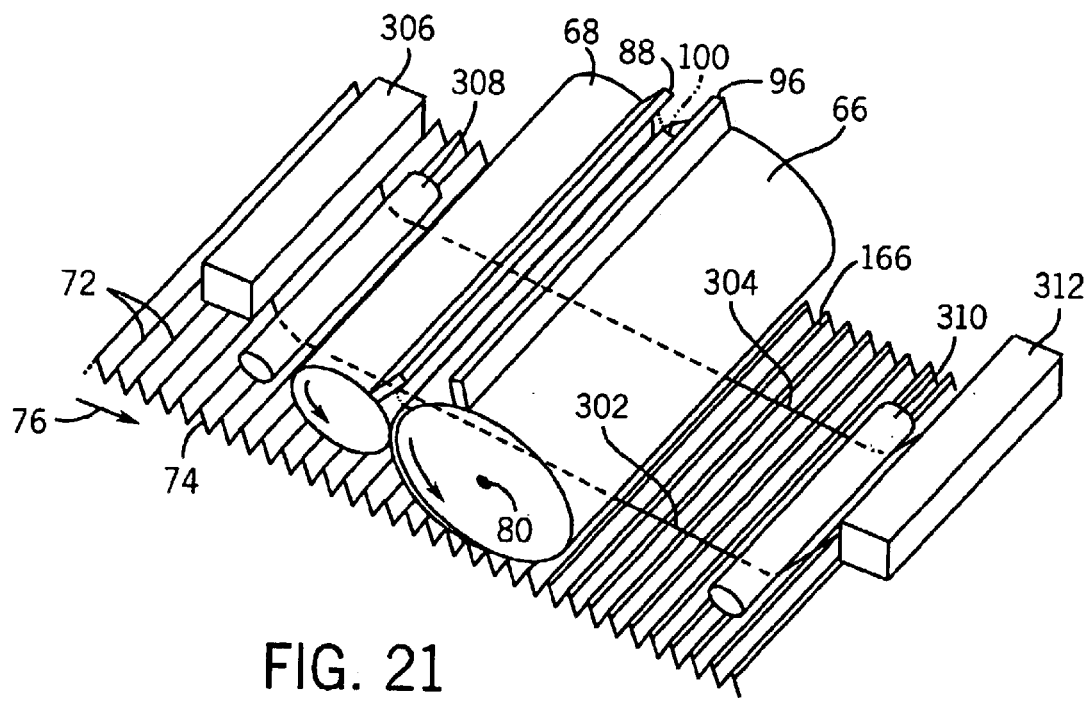
FIG. 21 is a perspective view illustrating the system of FIG. 20.
Figure 22:
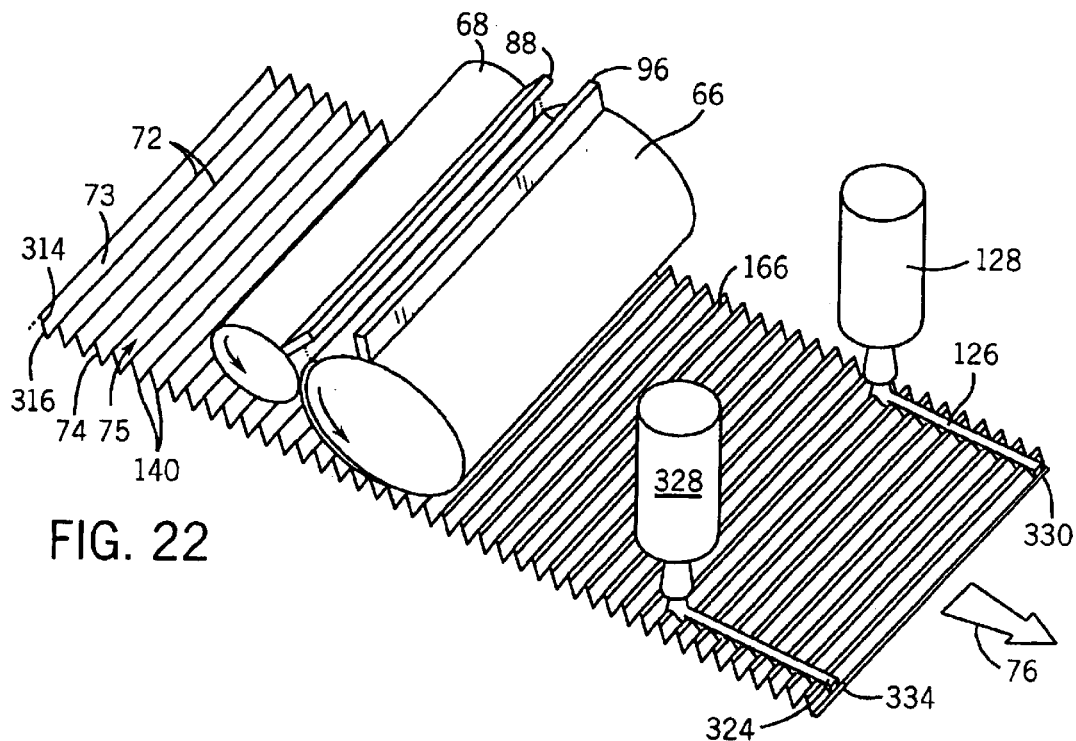
FIG. 22 is a view like FIG. 4 and shows a further embodiment.
Figure 23:
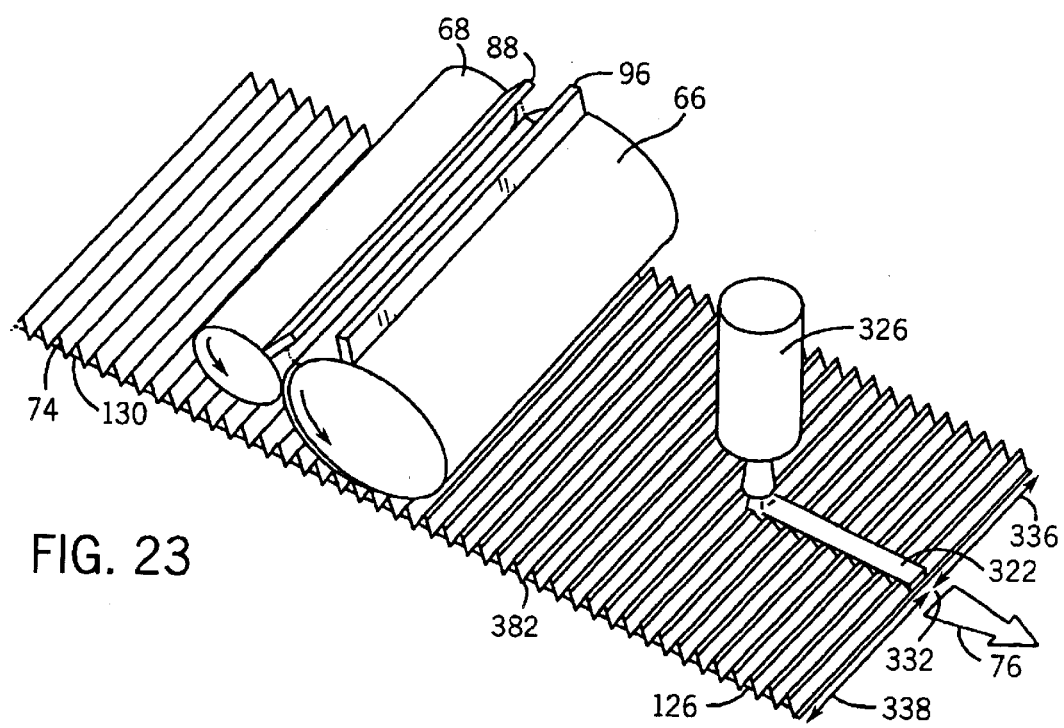
FIG. 23 is like FIG. 22 and shows the next processing step.

As noted above, pleat tips 72 extend along pleat or bend lines 166 transverse to forward direction of movement 76 of pleated filter media sheet 74 and parallel to rotational axis 80 of applicator roll 66. One or more threads 302, 304, FIGS. 20, 21 extend transversely across pleat tips 72 and parallel to the direction of movement 76 of pleated filter media sheet 74 and applicator roll 66 at their point of contact 86. Threads 302, 304 extend between applicator roll 66 and pleated filter media sheet 74 at their point of contact 86. The threads are provided by fishing line or the like and have been found to facilitate separational movement of pleated filter media sheet 74 away from applicator roll 66 after application of adhesive at point of contact 86 without substantially affecting the application of adhesive from applicator roll 66 to pleat tips 72 of pleated filter media sheet 74. This is desirable to prevent the pleated filter media sheet 74 from sticking to applicator roll 66. Threads 302, 304 extend in stationary manner from upstream stationary upper anchor 306 downwardly around guide rod 308 then rearwardly along the top of pleated filter media sheet 74 at pleat tips 72 and then beneath applicator roll 66 at point of contact 86 and then further rearwardly and around rod 310 to downstream upper stationary anchor 312.

Figure 24:
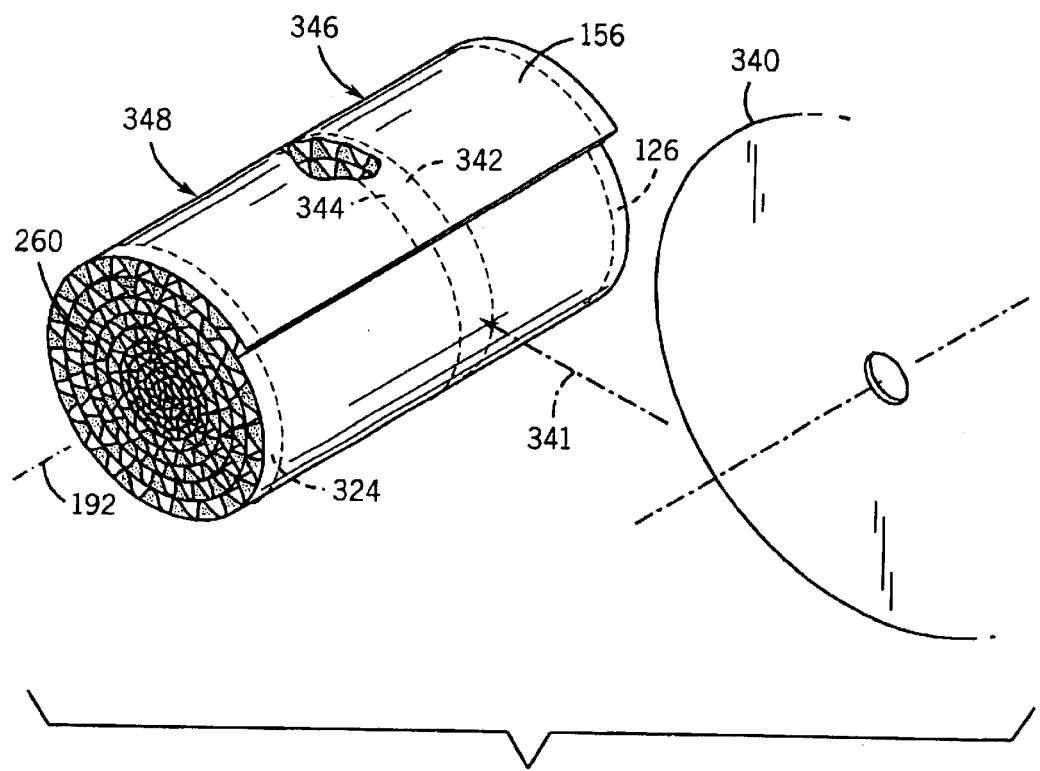
FIG. 24 is a schematic perspective view of a filter roll constructed in accordance with FIGS. 22 and 23, and illustrates a further processing step.
Figure 25:
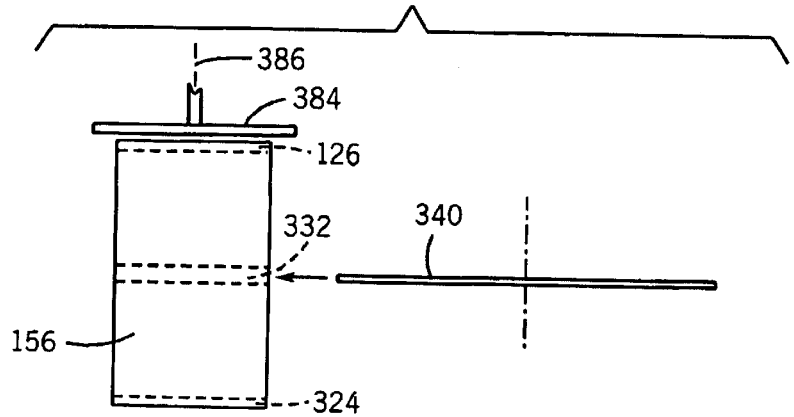
FIG. 25 is a top view of the system of FIG. 24.

FIGS. 22–25 illustrate a further embodiment including a system and method for making a plurality of spiral-wound filters in a single sequential winding operation of FIGS. 6 and 7. First and second sheets of filter media 74 and 130 are provided, first sheet 74 having first and second sides 314 and 316, FIGS. 6, 22, and second sheet 130 having first and second sides 318 and 320. First sheet 74 has the noted pleats defined by wall segments 73 extending in zig-zag manner between pleat tips 72, 140 at axially extending bend lines 166, the pleat tips 72 on first side 314 of first sheet 74 being in contiguous relation with first side 318 of second sheet 130 to define axial flow channels 75. Sheets 74, 130 are wound in a spiral about a winding axis 192 to a spiral-wound roll 156 with the pleat tips 140 on second side 316 of first sheet 74 in contiguous relation with second side 320 of second sheet 130. In this embodiment, at least three sets of sealant plugs 126, 322, 324, FIGS. 4, 8, 22, 23, are provided from respective dispensers 128, 326, 328, at serially axially spaced first, second and third axial locations 330, 332, 334, respectively, along channels 75. Two of the sets of plugs such as 126 and 324 are between one of the sides such as 314 of first sheet 74 and one of the sides such as 318 of the second sheet 130, and the other of the sets of plugs such as 332 is between the other of the sides such as 316 of the first sheet 74 and the other of the sides such as 320 of the second sheet 130. The first and second sets of plugs 126 and 322 are axially spaced by a first axial channel length 336 therebetween. The second and third sets of plugs 322 and 324 are axially spaced by a second axial channel length 338 therebetween. First and third sets of sealant plugs 126 and 324 are applied during the manufacturing step shown in FIG. 6. The second set of plugs 332 is applied during the manufacturing step shown in FIG. 7, i.e. after lamination of sheet 130 to sheet 74. After the noted spiral winding, spiral-wound roll 156, FIG. 24, is cut by a blade 340 transversely as shown at 341 through the noted second set of plugs 322 to cut such second set of plugs into first and second portions 342 and 344 to provide the plurality of filters, including a first spiral-wound wall-flow filter 346 having a plurality of axial flow channels alternately plugged at distally opposite ends by the first set of plugs 126 and the first portion 342 of the second set of plugs 322, respectively, and having the noted first axial channel length 336 therebetween, and a second spiral-wound wall-filter 348 having a plurality of axial flow channels alternately plugged at distally opposite axial ends by the noted third set of plugs 324 and the noted second portion 344 of the second set of plugs 322, respectively, and having the noted second axial channel length 338 therebetween. In the disclosed embodiment, the first set of sealant plugs 126 is provided between first side 314 of first sheet 74 and first side 318 of second sheet 130, the second set of sealant plugs 322 is provided between second side 316 of first sheet 74 and second side 320 of second sheet 130, and the third set of sealant plugs 324 is provided between first side 314 of first sheet 74 and first side 318 of second sheet 130. In an alternate embodiment, the first set of plugs 126 is provided between second side 316 of first sheet 74 and second side 320 of second sheet 130, the second set of plugs 322 is provided between first side 314 of first sheet 74 and first side 318 of second sheet 130, and the third set of plugs 324 is provided between second side 316 of first sheet 74 and second side 320 of second sheet 130.

Figure 26:
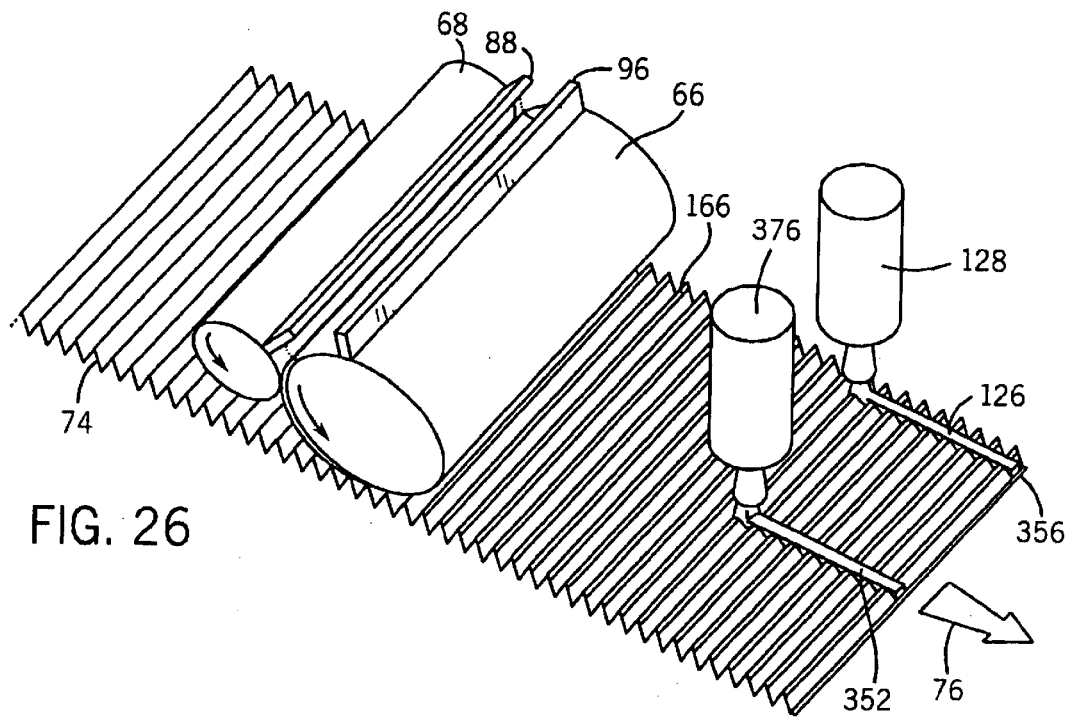
FIG. 26 is like FIG. 22 and shows a further embodiment.
Figure 27:
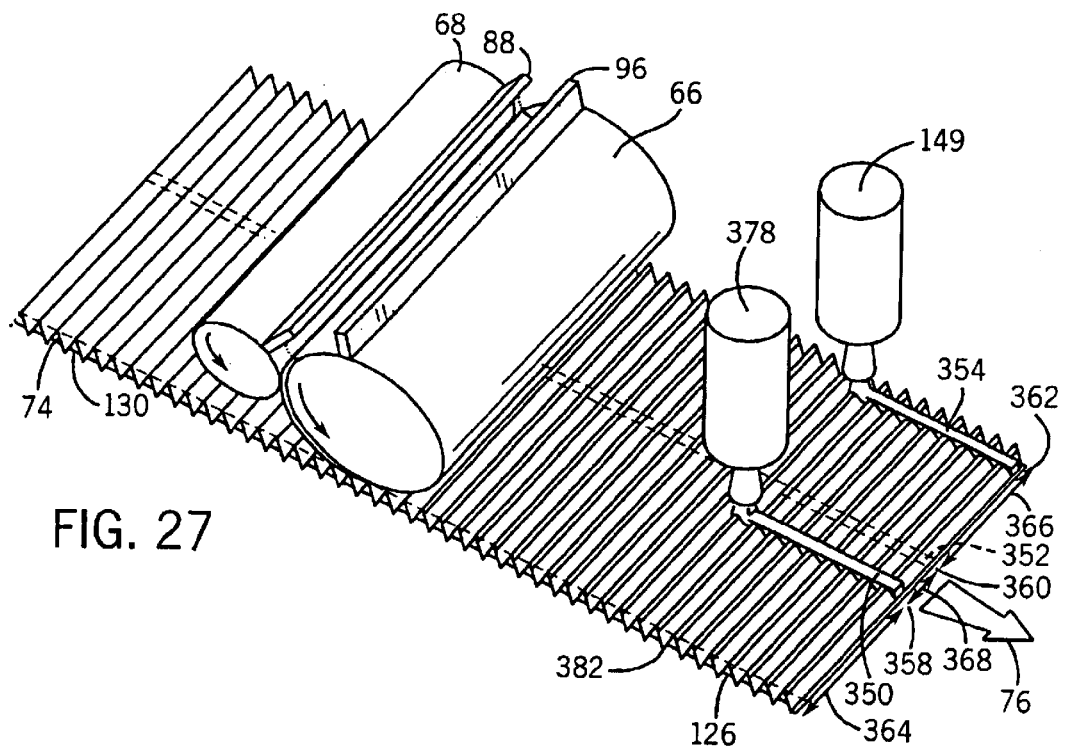
FIG. 27 is like FIG. 23 and shows a further embodiment.
Figure 28:
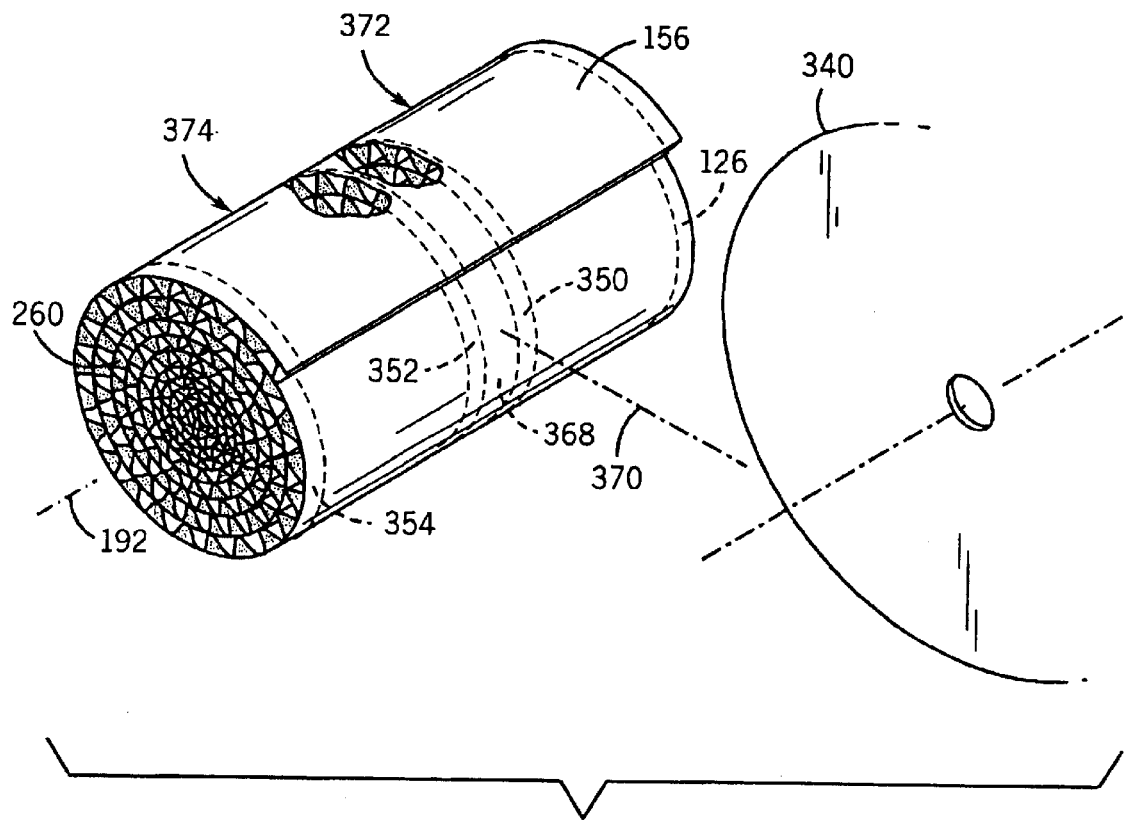
FIG. 28 is like FIG. 24 and shows a further embodiment.
Figure 29:
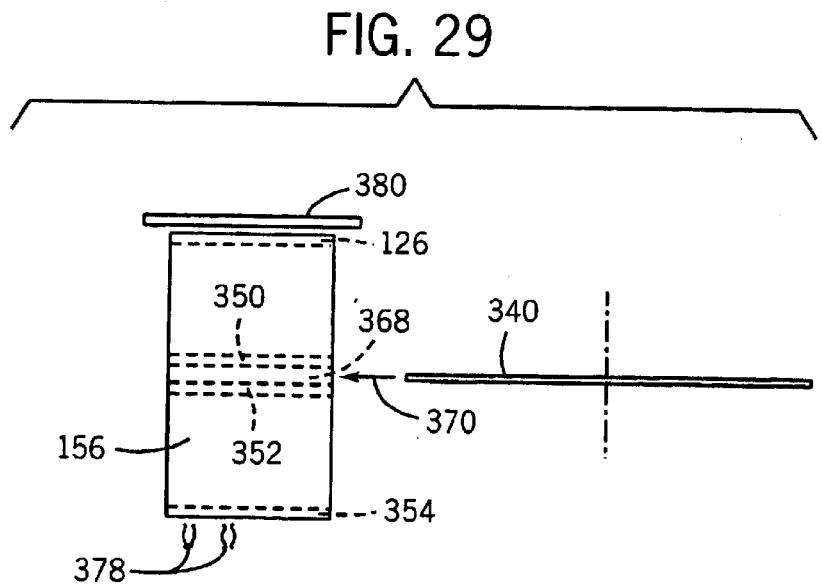
FIG. 29 is like FIG. 25 and shows a further embodiment.

FIGS. 26–29 illustrate a further embodiment and use like reference numerals from above where appropriate to facilitate understanding. At least four sets of sealant plugs 126, 350, 352, 354 are provided at serially axially spaced first, second, third and fourth axial locations 356, 358, 360, 362, respectively, along the channels. A first pair of the sets of plugs such as 126 and 352, FIGS. 26, 6, are between first side 314 of first sheet 74 and first side 318 of second sheet 130, and a second pair of the sets of plugs such as 350 and 354, FIG. 27, are between second side 316 of first sheet 74 and second side 320 of second sheet 130. First and second sets of plugs 126 and 350 are spaced by a first axial channel length 364 therebetween. Third and fourth sets of plugs 352 and 354 are axially spaced by a second axial channel length 366 therebetween. The second and third sets of plugs 350 and 352 are axially spaced by an axial gap 368 therebetween. Spiral-wound roll 156 is cut by cutting blade 340 transversely as shown at 370 through axial gap 368 to provide a plurality of filters including a first spiral-wound wall-flow filter 372 having a plurality of axial flow channels alternately plugged at distally opposite axial ends by the first and second sets of plugs 126 and 350, respectively, and having the noted first axial channel length 364 therebetween, and a second spiral-wound wall-flow filter 374 having a plurality of axial flow channels alternately plugged at distally opposite axial ends by the third and fourth sets of plugs 352 and 354, respectively, and having the noted second axial channel length 366 therebetween. In the disclosed embodiment, the first set of plugs 126 is provided between first side 314 of first sheet 374 and first side 318 of second sheet 130, the second set of plugs 350 is provided between second side 316 of first sheet 74 and second side 320 of second sheet 130, the third set of plugs 352 is provided between first side 314 of first sheet 74 and first side 318 of second sheet 130, and the fourth set of plugs 354 is provided between second side 316 of first sheet 74 and second side 320 of second sheet 130. In an alternate embodiment, the noted first set of plugs is provided between the noted first side of the noted first sheet and the noted first side of the noted second sheet, and the noted second set of plugs is provided between the noted second side of the noted second sheet and the noted second side of the noted second sheet, and the noted third set of plugs is provided between the noted second side of the noted first sheet and the noted second side of the noted second sheet, and the noted fourth set of plugs is provided between the noted first side of the noted first sheet and the noted first side of the noted second sheet. In another embodiment, the noted first set of plugs is provided between the noted second side of the noted first sheet and the noted second side of the noted second sheet, and the noted second set of plugs is provided between the noted first side of the noted first sheet and the noted first side of the noted second sheet, and the noted third set of plugs is provided between the noted second side of the noted first sheet and the noted second side of the noted second sheet, and the noted fourth set of plugs is provided between the noted first side of the noted first sheet and the noted first side of the noted second sheet. In a further embodiment, the noted first set of plugs is provided between the noted second side of the noted first sheet and the noted second side of the noted second sheet, and the noted second set of plugs is provided between the noted first side of the noted first sheet and the noted first side of the noted second sheet, and the noted third set of plugs is provided between the noted first side of the noted first sheet and the noted first side of the noted second sheet, and the noted fourth set of plugs is provided between the noted second side of the noted first sheet and the noted second side of the noted second sheet. Sealant plug strips 126 and 352 are dispensed by respective dispensers 128 and 376 during the manufacturing step shown in FIG. 6. Sealant plug strips 354 and 350 are dispensed by dispensers 149 and 378 during the manufacturing step shown in FIG. 7.

Figure 30:
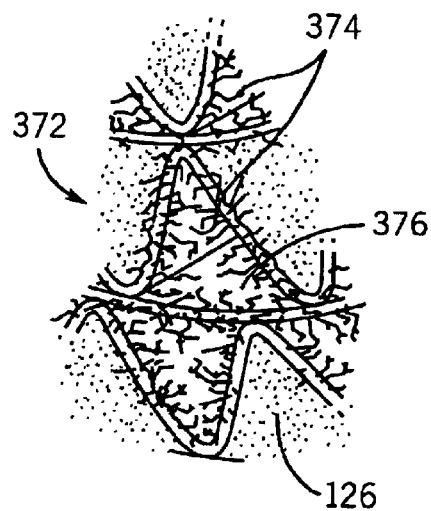
FIG. 30 is an enlarged end view of a portion of the structure of FIG. 24.
Figure 31:
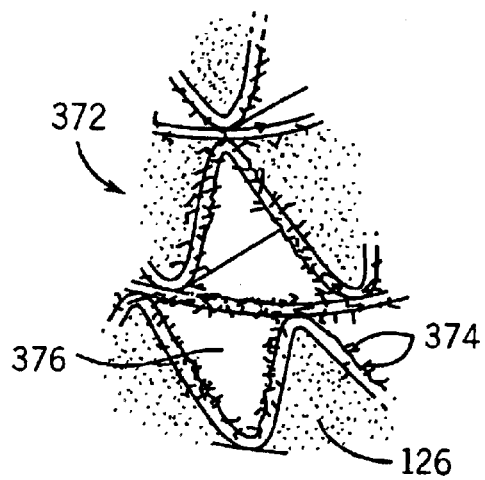
FIG. 31 is like FIG. 30, but after further processing.
Figure 32:
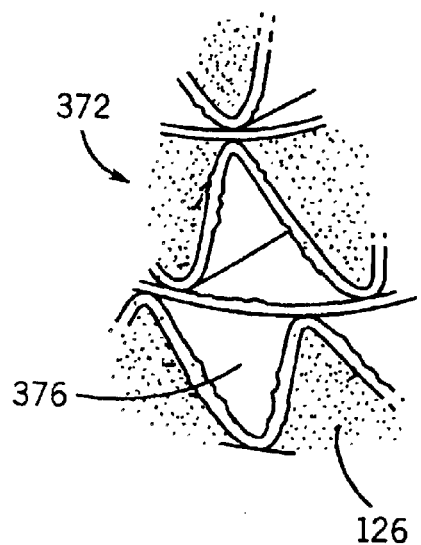
FIG. 32 is like FIG. 31, but after further processing.

In FIGS. 24–25 and 28–29, the spiral-wound roll or log 156 is cut transversely of winding axis 192 as shown at 341, 370, respectively. Sheets 74 and 130 are fibrous filter media having a plurality of fibers. The spiral-wound roll 156 is cut with a high-speed fine multi-tooth blade 340. The rotary speed of the blade and the fineness of the teeth of the blade are selected to minimize tearing of the fibers. After the noted cutting, the spiral-wound filter has an axial end face 372, FIG. 30. The ends such as 260 of the spiral-wound roll may also be cut to remove excess material 382 of sheets 74, 130 which extend axially beyond respective plugs. It has been found that applying heat to axial end face 372 removes cut fiber ends 374 from flow channel openings 376, to reduce flow restriction by increasing open channel space at the axial end face. Fibers 374 also hinder the penetration of a liquid impregnant or binder into the filter, and hence adversely affects the noted rigidification process. FIGS. 31 and 32 progressively show end face 372 after continued exposure to heat, illustrating continuing elimination of cut fiber ends 374 from channel openings 376. Exposure times vary based on trial and error, for example ranging from several seconds in the case of applying heat with a flame, for example as schematically shown at 378, FIG. 29, to several minutes in the case of applying heat with a hot surface such as a hot plate as schematically shown at 380 in FIG. 29. Sheets 74, 130 have the noted short axial extension portions such as 382, FIG. 23, extending beyond respective plugs such as 326. These axial extension portions such as 382 are removed by cutting, such as by blade 340 or by another cutting tool 384, FIG. 25, such as a sanding disc or a grinding wheel rotating about axis 386.

It is recognized that various equivalents, alternatives and modifications are possible within the scope of the appended claims. The systems herein are desirably applicable to high temperature filters including diesel exhaust aftertreatment filters, and are also applicable to other filters including various fluid filters including air filters. The preferred embodiment has been disclosed in connection with the pleated filter media sheet. The systems herein are applicable to various fluted filter media, including pleated filter media and corrugated filter media, having a plurality of flutes, such as pleats or corrugations, defined by wall segments extending in zig-zag manner between flute tips, such as pleat tips or corrugation tips, at axial extending bend lines, the flute tips on a first side of a first sheet being in contiguous relation with the first side of a second sheet to define axial flow channels, the sheets being wound in a spiral about a winding axis to a spiral-wound roll with the flute tips on the second side of the first sheet in contiguous relation with the second side of the second sheet.

What is claimed is:

1. A spiral winding system for winding first and second sheets of filter media into a spiral-wound roll, said first sheet having a plurality of flutes defined by wall segments extending in zig-zag manner between flute tips at axially extending bend lines, the flute tips on one side of said first sheet being in contiguous relation with said second sheet to define axial flow channels, comprising first and second spaced belts having a gap therebetween defining a winding zone receiving said first and second sheets of filter media, one of said sheets facing and engaging said first belt, the other of said sheets facing said second belt, wherein said sheets roll-wind in said winding zone such that said one sheet is engaged by said second belt to roll-wind said sheet into a spiral-wound roll, wherein said first belt is trained around a first set of rollers, said first set of rollers is mounted on a first carriage having one or more guide rails extending therefrom, said second belt is trained around a second set of rollers, said second set of rollers is mounted on a second carriage mounted on and moveable along said one or more guide rails toward and away from said gap.

2. The spiral winding system according to claim 1 wherein said first carriage is gravitationally below said second carriage, and wherein said second carriage is lifted away from said gap by said roll during said roll-winding such that wound-in tension is applied to said roll by said second carriage by the gravitational weight of said second carriage.

3. The spiral winding system according to claim 2 wherein:
said sheets move in a forward direction into said winding zone;
said first set of rollers comprises three rollers comprising first and second rollers lying in a first rectilinear plane parallel to said forward direction, and a third roller below said first rectilinear plane;
said second set of rollers comprises three rollers comprising first and second rollers lying in a second rectilinear plane above and parallel to said first rectilinear plane, and a third roller above said second rectilinear plane;
said first belt travels forwardly in said winding zone from said first roller of said first set to said second roller of said first set and is initially rectilinear in said winding zone along said first rectilinear plane and then flexes downwardly toward said third roller of said first set to a concave curvature upon said roll-winding; and
said second belt travels rearwardly in said winding zone from said first roller of said second set to said second roller of said second set and is initially rectilinear in said winding zone along said second rectilinear plane and then flexes upwardly toward said third roller of said second set to a concave curvature upon said roll-winding.

4. The spiral winding system according to claim 3 comprising an arm having first and second spaced journals, said first journal being pivotally mounted to one of said carriages, said second journal being journaled to the respective said third roller of the respective set of rollers for the respective belt of said one carriage, and a pivot control member controlling the amount of pivoting of said arm about said first journal to control tension in the respective belt.

5. The spiral winding system according to claim 3 comprising:
a first arm having first and second spaced journals, said first journal being pivotally mounted to said first carriage, said second journal being journaled to said third roller of said first set of rollers;
a first pivot control member controlling the amount of pivoting of said first arm about said first journal to control tension in said first belt;
a second arm having first and second spaced journals, said first journal of said second arm being pivotally mounted to said second carriage, said second journal of said second arm being journaled to said third roller of said second set; and
a second pivot control member controlling the amount of pivoting of said second arm about said first journal of said second arm to control tension in said second belt.

6. A spiral winding system for winding first and second sheets of filter media into a spiral-wound roll, said first sheet having a plurality of flutes defined by wall segments extending in zig-zag manner between flute tips at axially extending bend lines, the flute tips on one side of said first sheet being in contiguous relation with said second sheet to define axial flow channels, comprising first and second spaced belts having a gap therebetween defining a winding zone receiving said first and second sheets of filter media, one of said sheets facing and engaging said first belt, the other of said sheets facing said second belt, wherein said sheets roll-wind in said winding zone such that said one sheet is engaged by said second belt to roll-wind said sheet into a spiral-wound roll, and comprising a roll-starter in said winding zone starting said roll-winding of said sheets without a mandrel, wherein said roll-starter comprises an engagement member having a first position extending between said belts in said winding zone and engaging said sheets and starting said roll-winding, and a second position permitting said roll-winding.

7. The spiral winding system according to claim 6 wherein said sheets have a forward leading edge entering said winding zone and engaged by said engagement member in said first position, and wherein said engagement member in said second position is disengaged from and spaced from said leading edge.

8. A spiral winding system for winding first and second sheets of filter media into a spiral-wound roll, said first sheet having a plurality of flutes defined by wall segments extending in zig-zag manner between flute tips at axially extending bend lines, the flute tips on one side of said first sheet being in contiguous relation with said second sheet to define axial flow channels, comprising first and second spaced belts having a gap therebetween defining a winding zone receiving said first and second sheets of filter media, one of said sheets facing and engaging said first belt, the other of said sheets facing said second belt, wherein said sheets roll-wind in said winding zone such that said one sheet is engaged by said second belt to roll-wind said sheet into a spiral-wound roll, wherein said roll spiral-winds around a winding axis, and comprising a roll-starter comprising a rotary engagement member in said winding zone rotating about a rotational axis and engaging said sheets and starting said roll-winding, said rotation axis is parallel to said winding axis, said roll roll-winds about said winding axis in a first rotational direction, and said rotary engagement member rotates about said rotational axis in a second rotational direction opposite to said first rotational direction, and wherein said sheets have a forward leading edge entering said winding zone in a forward direction, and said rotary engagement member comprises a rotary brush rotating about said rotational axis and having a plurality of bristles extending radially outwardly therefrom and gripping said leading edge and re-directing said leading edge rearwardly in curled-over relation to initiate said roll-winding.

9. A spiral winding system for winding first and second sheets of filter media into a spiral-wound roll, said first sheet having a plurality of flutes defined by wall segments extending in zig-zag manner between flute tips at axially extending bend lines, the flute tips on one side of said first sheet being in contiguous relation with said second sheet to define axial flow channels, comprising first and second spaced belts having a gap therebetween defining a winding zone receiving said first and second sheets of filter media, one of said sheets facing and engaging said first belt, the other of said sheets facing said second belt, wherein said sheets roll-wind in said winding zone such that said one sheet is engaged by said second belt to roll-wind said sheet into a spiral-wound roll, said sheets are wound in tension in a spiral about a winding axis, and said flute tips extend along said bend lines parallel to said winding axis, and wherein said first belt is trained around a first set of rollers, said second belt is trained around a second set of rollers, and at least one of said sets of rollers is mounted on a carriage moveable toward and away from said winding axis and permitting growth of said roll during spiral-winding without crushing said wall segments between said flute tips.

10. A spiral-winding method for winding first and second sheets of filter media into a spiral-wound roll, said first sheet having a plurality of flutes defined by wall segments extending in zig-zag manner between flute tips at axially extending bend lines, the flute tips on one side of said first sheet being in contiguous relation with said second sheet to define axial flow channels, comprising providing first and second belts having a gap therebetween defining a winding zone, feeding said first and second sheets of filter media in a forward direction into said winding zone, one of said sheets facing and engaging said first belt, the other of said sheets facing said second belt, translating each said belt initially rectilinearly in said winding zone, roll-starting said sheets to roll-wind said sheets in said winding zone such that said one sheet is engaged by said second belt to roll-wind said sheets into a spiral-wound roll, flexing each said belt from an initially flat rectilinear extension to concave curvature upon said roll-winding, wherein said first and second sheets of filter media are wound in a spiral about a winding axis to a spiral-wound roll, said first sheet having said flute tips at axially extending bend lines parallel to said winding axis, training said first belt around a first set of rollers, training said second belt around a second set of rollers, mounting at least one of said sets of rollers on a carriage moveable toward and away from said winding axis, and permitting growth of said roll during said spiral-winding without crushing said wall segments between said flute tips by moving said carriage away from said winding axis.

\* \* \* \* \*